(12) United States Patent
Enomoto et al.

(10) Patent No.: US 7,528,973 B2
(45) Date of Patent: May 5, 2009

(54) IMAGE FORMING DEVICE CAPABLE OF ACQUIRING DATA FROM WEB SERVER

(75) Inventors: Katsunori Enomoto, Toyokawa (JP); Yoshiyuki Kondo, Okazaki (JP); Masatoshi Kokubo, Ama-gun (JP); Kazuma Aoki, Kasugai (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 983 days.

(21) Appl. No.: 10/369,616

(22) Filed: Feb. 21, 2003

(65) Prior Publication Data

US 2003/0164988 A1 Sep. 4, 2003

(30) Foreign Application Priority Data

Mar. 1, 2002 (JP) ............................ 2002-055929

(51) Int. Cl.
  *H04N 1/00* (2006.01)
  *H04N 1/333* (2006.01)
  *H04N 1/32* (2006.01)
  *H04N 1/23* (2006.01)
  *G06F 3/12* (2006.01)
  *G06K 15/02* (2006.01)
  *G06K 15/00* (2006.01)

(52) U.S. Cl. .................... 358/1.15; 358/1.13; 358/1.14; 358/400; 358/437; 358/406; 358/407; 358/468; 358/296; 358/1.17

(58) Field of Classification Search ........................ None
See application file for complete search history.

(56) References Cited

U.S. PATENT DOCUMENTS 4,161,779 A * 7/1979 Spencer et al. ................ 710/41
5,200,830 A * 4/1993 Imaizumi et al. ............. 358/296
5,812,746 A * 9/1998 Mishima et al. ............. 358/1.14
5,832,301 A * 11/1998 Yamaguchi .................. 710/48
6,141,356 A * 10/2000 Gorman ....................... 370/493

(Continued)

FOREIGN PATENT DOCUMENTS

GB    2274180 A  *  7/1994

(Continued)

OTHER PUBLICATIONS

RFC 2568: "Rationale for the Structure of the Model and Protocol for the Internet Printing Protocol", Apr. 1999, pp. 1-10. <http://tools.ietf.org/html/rfc2568> (visited Sep. 25, 2007).*

(Continued)

*Primary Examiner*—Twyler L Haskins
*Assistant Examiner*—Myles D Robinson
(74) *Attorney, Agent, or Firm*—Oliff & Berridge, PLC

(57) ABSTRACT

A facsimile device includes an outer case accommodating a circuit controller and a communication module. The communication module has a router function and can be directly connected to a broadband-capable modem, such as an ADSL modem, by a cable. The communication module can perform bi-directional communications with a web server on the Internet via the broadband-capable modem. The communication module also has a web printing function for printing images of data received from a web server on a recording unit. Hence, by connecting a broadband-capable modem to the communication module, the facsimile device can print data from web servers onto paper to facilitate viewing.

6 Claims, 27 Drawing Sheets

U.S. PATENT DOCUMENTS

| | | | |
|---|---|---|---|
| 6,298,164 B1 * | 10/2001 | Suzuki et al. | 382/245 |
| 6,330,070 B1 * | 12/2001 | Toyoda et al. | 358/1.15 |
| 6,431,772 B1 * | 8/2002 | Melo et al. | 400/70 |
| 6,603,569 B1 * | 8/2003 | Johnson, Jr. et al. | 358/1.15 |
| 7,059,784 B2 * | 6/2006 | Aoki | 400/61 |
| 7,103,633 B1 * | 9/2006 | Malik | 709/206 |
| 7,177,043 B2 * | 2/2007 | Qiao | 358/1.15 |
| 7,180,638 B1 * | 2/2007 | Hou et al. | 358/439 |
| 7,231,432 B2 * | 6/2007 | Aoki | 709/219 |
| 7,369,257 B2 * | 5/2008 | Enomoto et al. | 358/1.15 |
| 7,375,846 B2 * | 5/2008 | Kokubo et al. | 358/1.6 |
| 2001/0018353 A1 | 8/2001 | Ishigaki | |
| 2002/0071139 A1 * | 6/2002 | Janik | 358/1.15 |
| 2003/0164987 A1 * | 9/2003 | Enomoto et al. | 358/400 |
| 2003/0184796 A1 * | 10/2003 | Kokubo et al. | 358/1.15 |
| 2003/0187958 A1 * | 10/2003 | Aoki | 709/219 |
| 2003/0187965 A1 * | 10/2003 | Enomoto et al. | 709/221 |
| 2004/0062585 A1 * | 4/2004 | Aoki | 400/76 |
| 2004/0073689 A1 * | 4/2004 | Aoki et al. | 709/229 |
| 2004/0130746 A1 * | 7/2004 | Wu | 358/1.15 |
| 2004/0160636 A1 * | 8/2004 | Kondo et al. | 358/1.15 |
| 2006/0028679 A1 * | 2/2006 | Uchiyama et al. | 358/1.15 |
| 2006/0028680 A1 * | 2/2006 | Uchiyama et al. | 358/1.15 |
| 2006/0153614 A1 * | 7/2006 | Aoki | 400/61 |

FOREIGN PATENT DOCUMENTS

| | | |
|---|---|---|
| JP | A 10-65853 | 3/1998 |
| JP | A 11-134125 | 5/1999 |
| JP | A-11-194984 | 7/1999 |
| JP | 11266332 A * | 9/1999 |
| JP | A 2000-101775 | 4/2000 |
| JP | 2000-200247 | 7/2000 |
| JP | 2001-250057 | 9/2001 |
| JP | A-2001-243243 | 9/2001 |
| JP | 2001-270201 | 10/2001 |
| JP | A 2001-339549 | 12/2001 |
| JP | A 2001-339561 | 12/2001 |
| JP | 2002-118687 | 4/2002 |
| JP | 2003-8821 | 1/2003 |
| JP | 2004118701 A * | 4/2004 |
| JP | 2004288193 A * | 10/2004 |

OTHER PUBLICATIONS

"Pipeline's Internet Printing System Lets the Printer Surf the Web." The Hard Copy Observer. Mar. 1997. pp. 45-46.*

* cited by examiner

FIG.5(a)
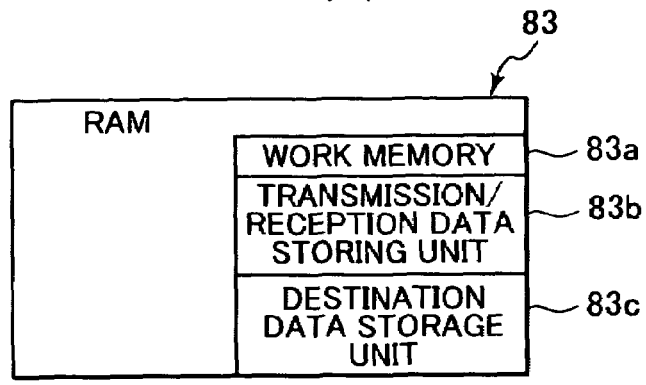
FIG.5(b)
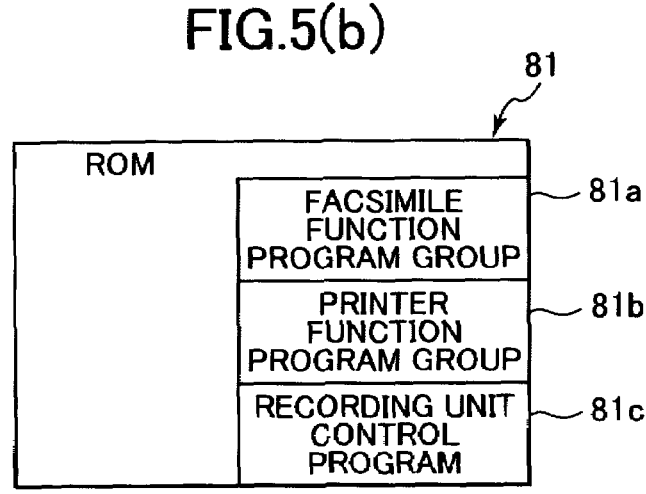
FIG.5(c)
(DESTINATION DATA STORAGE UNIT 83c)
| DESTINATION 1 | 03-**-** |
| --- | --- |
| | aaa@***.co.jp |
| DESTINATION 2 | 06-**-** |
| | bbb@***.co.jp |
| DESTINATION 3 | 052-*-** |
| | ccc@***.co.jp |
| ⋮ | ⋮ |
| DESTINATION n | TELEPHONE NUMBER |
| | E-MAIL ADDRESS |

FIG.6(c)

(URL DATA STORAGE UNIT 115c)

| URL | MEMO | MONTHLY (DATE) | WEEKLY (DAY) | DAILY (TIME) |
|---|---|---|---|---|
| http://www.**.co.jp/ | XX COMPANY | 15 | – | – |
| http://www.**.co.jp/subdir/ | XX SHOP | – | THURS. | – |
| http://www.**.ne.jp/abc.htm | XX NEWSPAPER | – | – | 10:00 |
| http://www.**.go.jp/ | XX OFFICE | – | – | – |
| http://www.**.com/top.html | **** | | | |

SCHEDULER SETTING DATA

FIG.6(d)

(TRANSFER DESTINATION DATA STORAGE UNIT 115d)

| TRANSFER DESTINATION | ADDRESS (IP ADDRESS: PORT NO.) |
|---|---|
| PRINTER TRANSFER | 10.123.45.67:3000 |
| PC TRANSFER | 10.123.45.68:3001 |

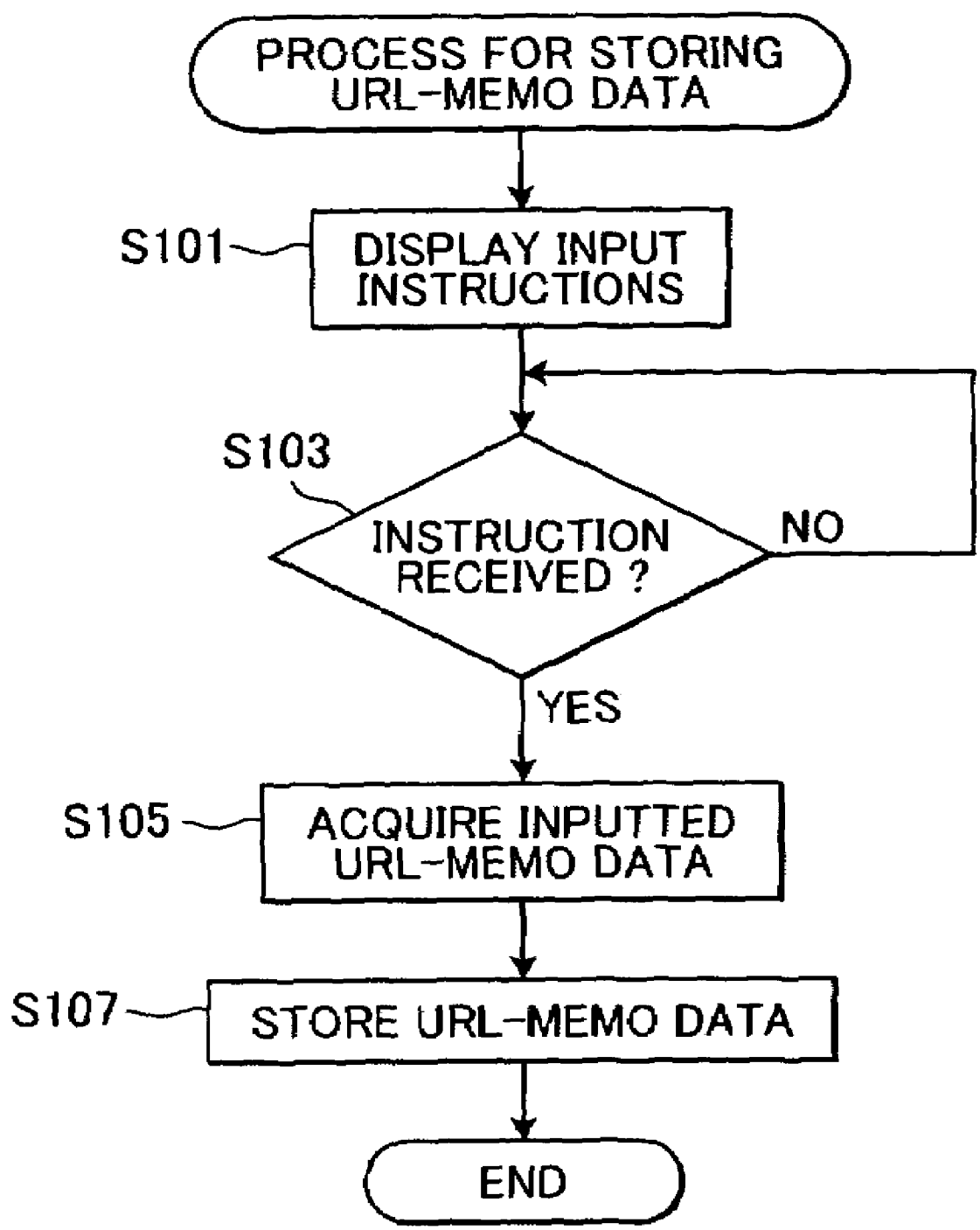

FIG.8

(FLAG DATA 113b)

| FUNCTION / OPERATING MODE | PRINT | SAVE | PRINTER TRANSFER | PC TRANSFER | MONOCHROME PRINT | QUIET PRINT | LOG SAVE | ERROR DISPLAY |
|---|---|---|---|---|---|---|---|---|
| NORMAL | 1 | 0 | 0 | 0 | 0 | 0 | 1 | 0 |
| URL ACCESS NOT AUTHORIZED | 0 | 0 | 0 | 0 | 0 | * | 1 | * |
| CANCEL PRINT | 0 | 0 | 0 | 0 | 0 | * | 1 | * |
| PASSWORD ERROR | 0 | 1 | 0 | 0 | 0 | * | 1 | * |
| KEYWORD ERROR | 0 | 0 | 0 | 1 | 0 | * | 1 | * |
| SAME CONTENT DETECTED | 0 | 0 | 0 | 1 | 0 | * | 1 | * |
| NIGHTTIME PRINT | * | * | * | 0 | * | 1 | * | * |
| ANSWERING MACHINE | 0 | * | 1 | 1 | * | 0 | * | * |
| LARGE VOLUME MONOCHROME PRINTING | 0 | * | * | * | 0 | 0 | 1 | 0 |
| OUT-OF-PAPER ERROR | 0 | * | * | * | * | * | 1 | 1 |
| OUT-OF-TONER ERROR | 0 | * | * | * | * | * | 1 | 2 |

(1 OR GREATER: ON, 0: OFF)

(MONOCHROME PRINT – 1: BLACK, 2: CYAN, 4: MAGENTA)

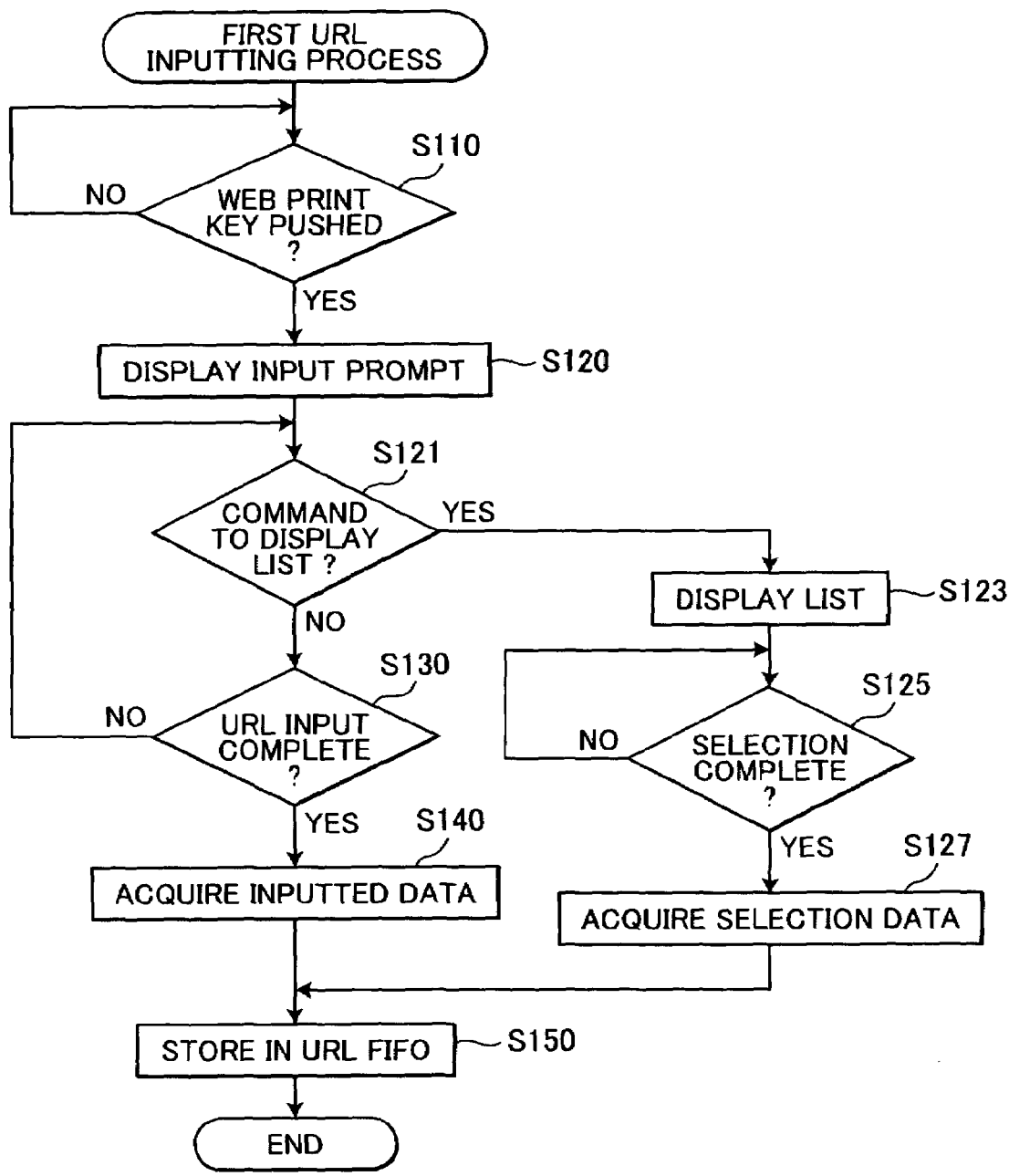

IMAGE FORMING DEVICE CAPABLE OF ACQUIRING DATA FROM WEB SERVER

BACKGROUND OF THE INVENTION

1. Field of the Invention

The present invention relates to an image forming device capable of acquiring data from a web server.

2. Description of the Related Art

Accompanying the rising popularity of the Internet in recent years, the transfer rate in data communications continues to increase. Communication systems known as broadband systems are becoming widely popular for their ability to connect to the Internet in communication environments having a data transfer rate exceeding about 500 kbps.

Some broadband systems well known in the art include cable Internet employing a cable television (CATV) network, FTTH (Fiber to the Home) employing optical fibers provided to individual households, and DSL (Digital Subscriber Line) employing the normal telephone lines provided in most households. A particular type of DSL well known in the art called ADSL (Asymmetric DSL) provides faster transfer rates to the user than from the user.

When connecting a communication device such as a personal computer to the Internet using this type of communication system, it is necessary to connect a signal converting device (hereinafter referred to as a broadband-capable modem) supporting the above types of broadband, such as a cable modem, media converter, or DSL modem (ADSL modem, etc.) to the communication device.

An apparatus known as a broadband router must be connected between the broadband-capable modem and the communication device in order to connect a plurality of communication devices to the Internet using a single global IP address. This broadband router is provided with a routing function for controlling data paths while converting between a private IP address used on a local area network (LAN) and a global IP address used on the Internet, serving as a wide area network (WAN).

In the conventional communication system shown in FIG. 29, for example, communication devices on the user end, such as personal computers 13, 14, and 18, are connected by cable to the Internet via a broadband router 121 and a broadband-capable modem 123 in sequence.

However, in order to connect a communication device to the Internet as described above, it is necessary to reserve space for installing a plurality of devices, including the broadband-capable modem and broadband router, and the installer must have technical knowledge concerning networks. Furthermore, the cables used to connect each device can be an eyesore.

Conventionally, it has been impossible to reference data content stored on an external web server without using the personal computers 13, 14, and 18, for example. Therefore, there have been some cases in which a user cannot reference such data content even when a broadband-capable system has been installed in the user's building because the user does not possess a personal computer or the like.

SUMMARY OF THE INVENTION

In view of the foregoing, it is an object of the present invention to provide an image forming device and communication system for enabling a user to access data content on a web server with ease.

In order to overcome the above and other objects, the present invention provides an image forming device including an image forming unit that forms images on a recording medium, a communicating unit that is connectable directly to a broadband-capable modem so as to perform bi-directional communications with a web server that is provided on a wide area network via the broadband-capable modem, a data outputting unit that has a web printing function for controlling the image forming unit to form images on a recording medium based on data that the communicating unit receives from the web server, and a main case accommodating the image forming unit, the communicating unit, and the data outputting unit.

There is also provided a communication system including an image forming device, a broadband-capable modem, and a LAN terminal. The forming device includes an image forming unit that forms images on a recording medium, a communicating unit that is connectable directly to a broadband-capable modem so as to perform bi-directional communications with a web server that is provided on a wide area network via the broadband-capable modem, a data outputting unit that has a web printing function for controlling the image forming unit to form images on a recording medium based on data that the communicating unit receives from the web server, and a main case accommodating the image forming unit, the communicating unit, and the data outputting unit. The communicating unit is connectable to a local area network and transmits data received from the web server to a LAN terminal on the local area network. The broadband-capable modem is connected to and capable of performing bi-directional communications with the communicating unit of the image forming device, and relays communications between a web server provided on a wide area network and the image forming device. The LAN terminal is connected to and capable of performing bi-directional communications with the communicating means of the image forming device, the LAN terminal being capable of receiving data that the communicating means of the image forming device receives from the web server.

BRIEF DESCRIPTION OF THE DRAWINGS

In the drawings:

FIG. 5(a) is an explanatory diagram illustrating data structure of a RAM of a main unit shown in FIG. 4;

FIG. 5(b) is an explanatory diagram illustrating data structure of a ROM of the main unit;

FIG. 5(c) is an explanatory diagram illustrating data structure of a destination data storage unit of the RAM of FIG. 5(a);

FIG. 6(c) is an explanatory diagram showing data structure of a URL data storage unit of FIG. 6(a);

FIG. 6(d) is an explanatory diagram showing data structure of a transfer destination data storage unit of FIG. 6(a);

FIG. 7 is a flowchart showing a process executed by the CPU 111 in the web printing unit for recording URL-memo data;

FIG. 8 is an explanatory diagram illustrating the data structure of the flag data of FIG. 6(*b*);

FIG. 9 is a flowchart representing a first URL inputting process according to the present embodiment;

FIG. 10 is an explanatory diagram showing the data structure of the URL FIFO;

DESCRIPTION OF THE PREFERRED EMBODIMENT

Next, an image forming device according to a preferred embodiment of the present invention will be described while referring to the accompanying drawings.

Figure 1:
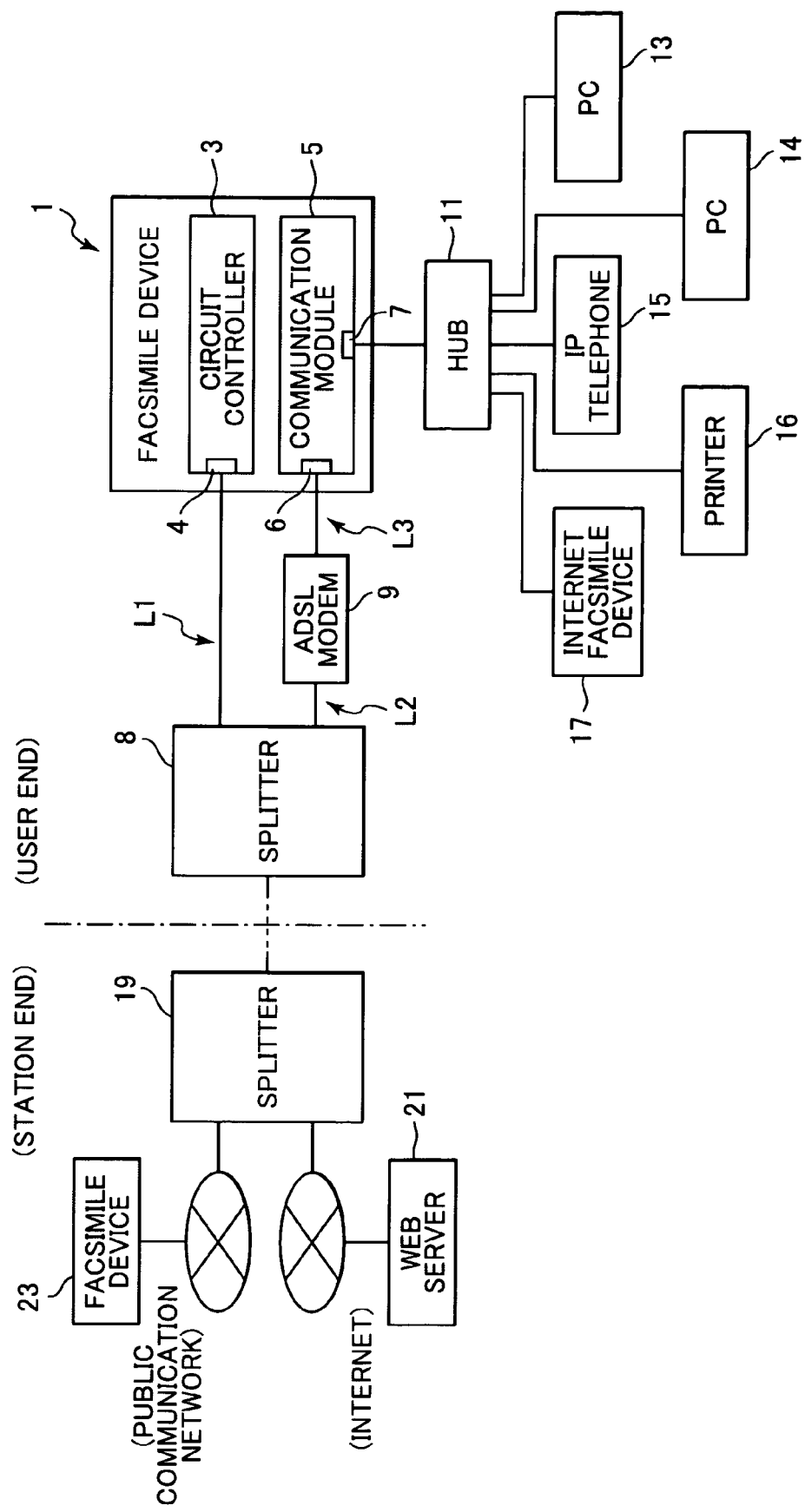
FIG. 1 is a block diagram showing an example of using a facsimile device according to an embodiment of the present invention.
Figure 2:
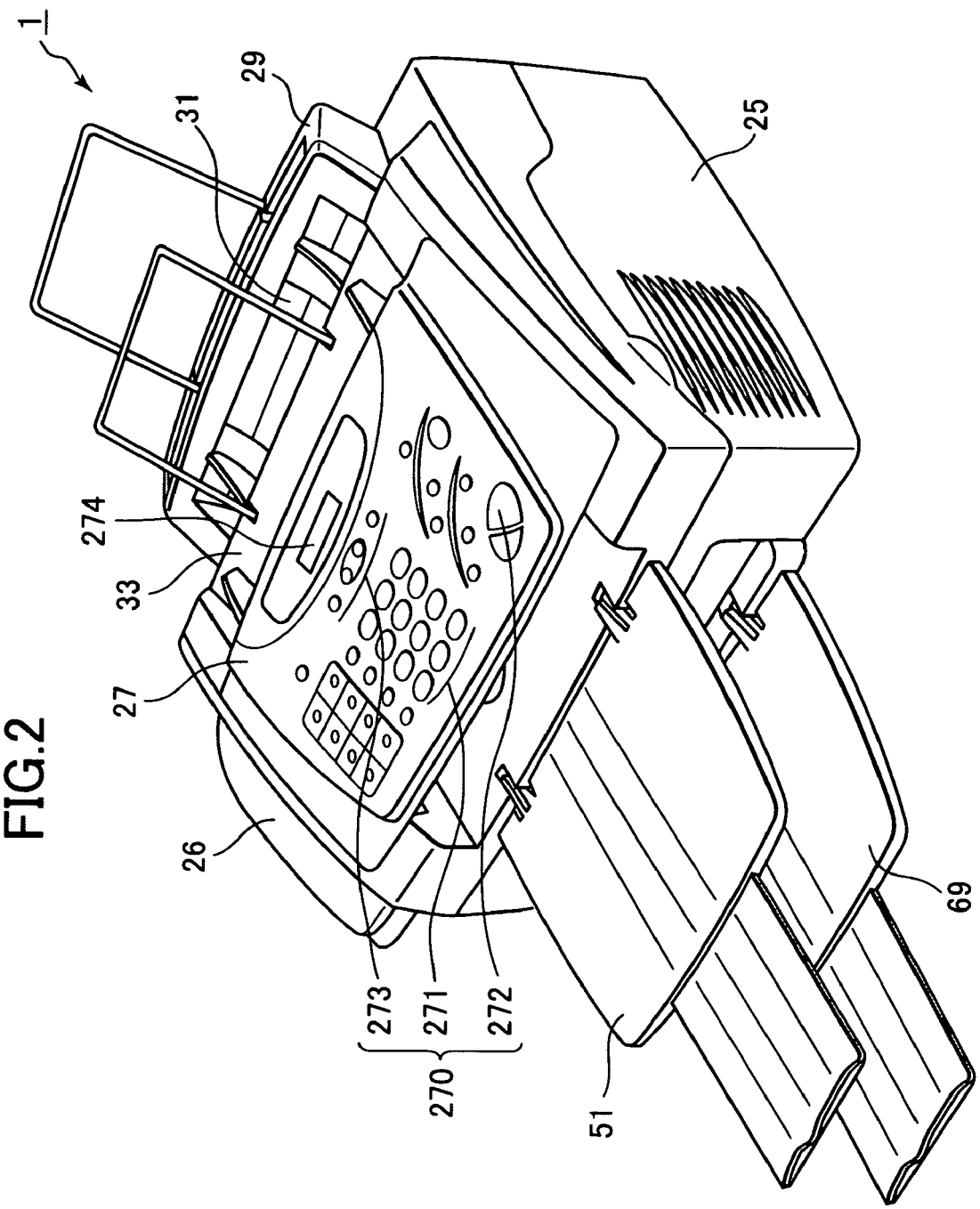
FIG. 2 is a perspective view showing an external construction of the facsimile device.
Figure 3:
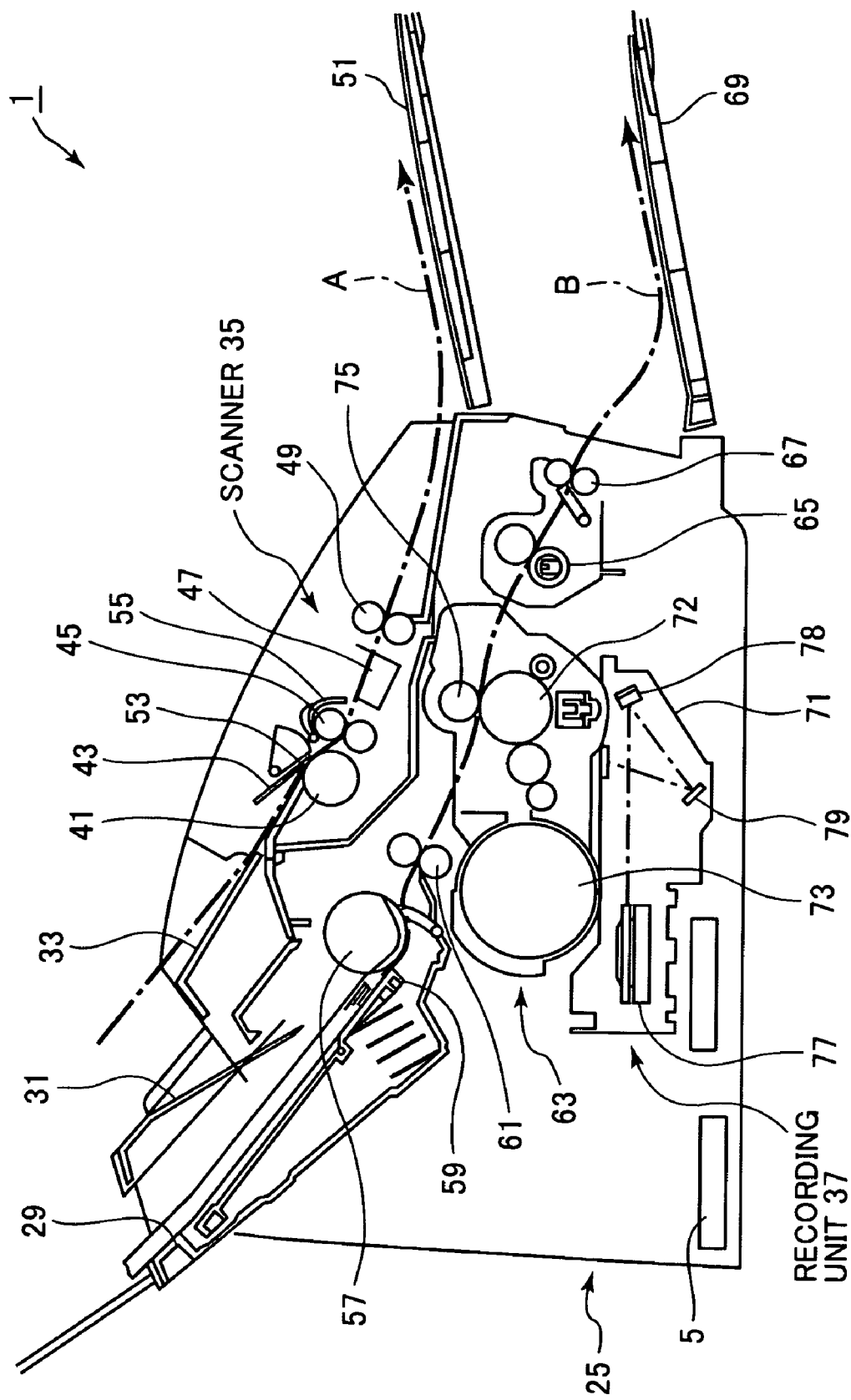
FIG. 3 is an explanatory diagram showing an internal construction of the facsimile device.

FIG. 1 is a block diagram illustrating an example of using a facsimile device 1 applying the present invention. FIG. 2 is a perspective view showing the overall external configuration of the facsimile device 1. FIG. 3 is a side cross-sectional view showing the internal construction of the facsimile device 1.

As shown in FIG. 1, the facsimile device 1 includes a circuit controller 3 and a communication module 5. The circuit controller 3 is provided with an external connection port 4. An analog line L1 (a telephone line formed of either two or four leads) connects between the external connection port 4 and a telephone connection port on a splitter 8 provided in a home office or other building.

The communication module 5 is provided with a WAN connection port 6 and a LAN connection port 7. The WAN connection port 6 is connected to an ADSL modem 9 via a LAN cable L3. The LAN connection port 7 is connected to a hub 11. The ADSL modem 9 is connected to an ADSL modem connection port in the splitter 8 via a LAN cable L2.

LAN terminals 13 through 17 are connected to the hub 11. The LAN terminals include a plurality of personal computers 13 and 14 capable of performing bi-directional communications, a printer 16, such as an inkjet printer or laser printer capable of connecting to a network, an IP telephone 15 capable of transmitting voice signals by Internet Protocol, and an Internet facsimile device 17 capable of connecting to the Internet. In other words, the hub 11 is connected to a local area network (LAN) provided in a building and configured of the above-described LAN terminals 13 through 17.

The splitter 8 is a device used for ADSL well known in the art. The splitter 8 is configured to receive a transmission signal from a splitter 19 provided on the base station end. The transmission signal includes a first signal of about 4 kHz or less superimposed on a second signal of a higher frequency for ADSL. The splitter 8 separates the first and second signals and outputs the first signal to the telephone connection port and the second signal to the ADSL modem connection port. The splitter 8 also superimposes signals received via these connection ports and transmits the superimposed signal to the splitter 19 on the base station end.

That is, the facsimile device 1 of the present embodiment can connect to a subscriber telephone on a public communication network (that is, a public switching telephone network: PSTN) using the circuit controller 3. The facsimile device 1 can also connect to the Internet serving as a wide area network (WAN) via the communication module 5 and the ADSL modem 9.

Through operations of a router controller 101 (FIG. 4) provided in the communication module 5, the facsimile device 1 functions as a router for routing data (IP packets) that is transmitted and received between a communication device on the Internet (such as a web server 21) and the LAN terminals 13 through 17 on the LAN.

The facsimile device 1 of the present embodiment has a facsimile function, a printer function, and a copy function. The facsimile function optically scans images from an original document, converts image data representing the scanned image into facsimile data, and transmits the facsimile data via the analog line L1 to an external facsimile device 23 connected to the public communication network. The facsimile function also receives facsimile data transmitted from the external facsimile device 23 via the public communication network and the analog line L1, and forms images on a recording paper based on the facsimile data.

The printer function is a function for forming images on a recording paper based on code data transmitted by a word processor or the personal computer 13 or 14. When the facsimile device 1 receives code data from an external personal computer via a PC interface 24 (FIG. 4) or from the personal computer 13 or 14 on the LAN via the communication module 5, the facsimile device 1 forms images based on the code data on recording paper. The copy function is a photocopying function for scanning images from an original document using a scanner 35 and a recording unit 37 (described later) and forming images on recording paper based on the image data.

As shown in FIG. 2, the facsimile device 1 having the functions described above includes an outer case 25, a handset 26 mounted on the side of the outer case 25, and an operating panel 27 provided on the front portion of the top surface of the outer case 25. The operating panel 27 is provided with various operating keys 270 including numeral keys 271 for inputting the telephone number (fax number) of other parties, a start key 272, and a select key 273, and a liquid crystal display (LCD) 274 for displaying data related to the various functions.

In addition, a first paper tray 29 for accommodating recording paper to be fed into the device is provided on the top back portion of the outer case 25. A second paper tray 31 is provided above the first paper tray 29 to enable the user to feed recording paper by hand. An original document feed tray 33 is provided above the second paper tray 31 for accommodating original documents to be scanned.

As shown in FIG. 3, the outer case 25 accommodates the scanner 35 for scanning images from an original document, the recording unit 37 for forming multicolor images on recording paper, and a circuit board (not shown) on which a CPU 39 (FIG. 4) is mounted for controlling the scanner 35 and recording unit 37.

In the scanner 35, a document sensor (not shown) detects an original document placed in the original document feed tray 33. A feed mechanism formed of a feed roller 41, a separating pad 43, and the like picks up the original document one sheet at a time and feeds the document in a direction of an arrow A in FIG. 3. A conveying roller 45 conveys the original document to a scanning unit 47. The scanning unit 47 scans the images formed on the original document. After being scanned by the scanning unit 47, the original document is discharged by a discharge roller 49 onto a first discharge tray 51 provided on the front of the outer case 25.

In addition to the document sensor described above, the scanner 35 is provided with a leading edge sensor 53 for detecting the leading edge of the document and a trailing edge sensor 55 for detecting the trailing edge of the document. The CPU 39 regulates the document feeding process by controlling each unit in the scanner 35 based on detection results from these sensors 53, 55 in order to execute the operations of the scanner 35.

In the recording unit 37, a feed mechanism formed of a feed roller 57, a separating pad 59, and the like picks up recording paper loaded in either the first paper tray 29 or the second paper tray 31 one sheet at a time, and feeds the recording paper in a direction of an arrow B in FIG. 3. A conveying roller 61 conveys the sheet of recording paper to an image forming device 63. The image forming device 63 forms multicolor images on the recording paper by using toner of a plurality of colors (in the present embodiment, cyan, magenta, yellow, and black). After passing the image forming device 63, the recording paper is conveyed downstream to a fixing device 65. The fixing device 65 fixes the toner image on the recording paper. After further passing through the fixing device 65, the recording paper is discharged by a discharge roller 67 onto a second discharge tray 69 provided on the front of the outer case 25.

The image forming device 63 operates a laser scanning device 71 to irradiate laser light on a photosensitive drum 72 and form electrostatic latent images on the surface thereof. The laser scanning device 71 includes a laser emitting unit 77 for emitting laser light based on image data according to commands from the CPU 39, a lens 78 for reflecting laser light, a reflecting mirror 79 for guiding light reflected by the lens 78 onto the photosensitive drum 72, and the like. The image forming device 63 further includes a toner tank 73 storing toner. After an electrostatic latent image is formed on the photosensitive drum 72, toner from the toner tank 73 is selectively deposited on the photosensitive drum 72. A transfer roller 75 applies an electrical charge to the recording paper in order to transfer the toner deposited on the photosensitive drum 72 to the recording paper. Note that the diagram of the image forming device 63 shown in FIG. 3 is a conceptual drawing for describing the functions of the image forming device 63. That is, the image forming device 63 is configured of an image forming device well known in the art for forming color toner images. A toner image for each color is formed as described above, and the toner images are superimposed on one another to form a multicolor image.

Next, the electrical configuration of the facsimile device 1 will be described.

Figure 4:
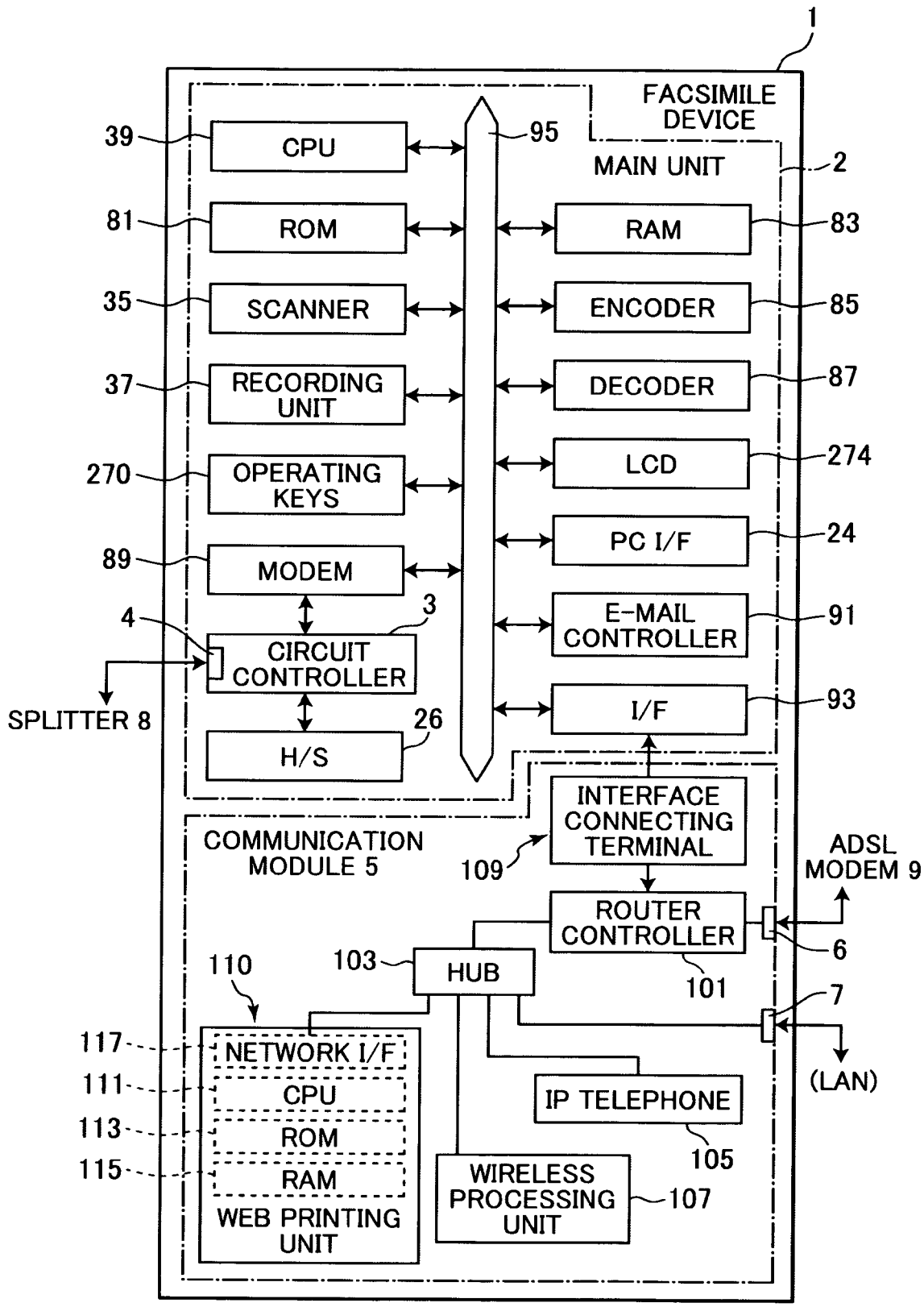
FIG. 4 is a block diagram showing an electrical configuration of the facsimile device.

As shown in FIG. 4, the facsimile device 1 primarily includes the CPU 39, a read only memory (ROM) 81, a random access memory (RAM) 83, the scanner 35, an encoder 85, the recording unit 37, a decoder 87, the operating keys 270, the LCD 274, a modem 89, the circuit controller 3, the PC interface 24, an e-mail controller 91, and a function expansion interface 93. All of these components are connected via a bus 95, and defining a main unit 2. The communication module 5 is connected to the function expansion interface 93.

The CPU 39 serves as the control center of the facsimile device 1 by performing overall control of the facsimile device 1. For example, the CPU 39 reads programs for control processes that are prestored in the ROM 81 and executes processes, such as transmission and reception of facsimile data and as address entry, according to these programs.

As shown in FIG. 5(b), the ROM 81 stores a facsimile function program group 81a, a printer function program group 81b, a recording unit control program 81c, various other programs not shown in the drawing, and various data required when executing these programs.

The facsimile function program group 81a is for operating the facsimile device 1 as a facsimile device. For example, the facsimile function program group 81a includes a reception program for forming images with the recording unit 37 based on facsimile data that the circuit controller 3 receives from the external facsimile device 23.

The printer function program group 81b is for operating the facsimile device 1 as a printer. For example, the printer function program group 81b includes a PC printing program for forming images using the recording unit 37 based on data that the communication module 5 receives from the personal computer 13 or 14 on the LAN.

The recording unit control program 81c is called by the above programs and the like.

As shown in FIG. 5(a), the RAM 83 functions as a work memory 83a that is necessary for performing various control processes, a transmission/reception data storing unit 83b for storing facsimile data and the like, and a destination data storage unit 83c for storing destination data related to the transmission destination of the facsimile data.

As shown in FIG. 5(c), the destination data storage unit 83c can store telephone numbers as destination data for the transmission destination of facsimile data and can also store e-mail addresses in association with these telephone numbers. That is, the facsimile device 1 is capable of storing both a telephone number and e-mail address for each destination in case of when another device (external facsimile device 23) is not only capable of transmitting and receiving facsimile data via a public communication network, but also is capable of transmitting and receiving e-mail via the Internet.

The scanner 35 functions to scan an original document when copying or transmitting facsimile data or the like. As described above, the scanner 35 of the present embodiment is configured to pick up the original document from the original document feed tray 33, scan the images with the scanning unit 47, and output image data to the encoder 85 and the like as scanning results.

The encoder 85 executes an encoding process for converting image data scanned by the scanner 35 into G3 compressed image data in a facsimile format, and outputs the converted image data. The decoder 87 decodes image data in the facsimile format for converting into image data that can be processed by the recording unit 37.

As described above, the recording unit 37 functions as a color laser printer capable of forming color images. The recording unit 37 uses the image forming device 63 to print color images on a recording paper based on image data decoded by the decoder 87 and according to instruction from the CPU 39 executing the recording unit control program 81c and outputs the recording paper after the printing process.

The recording unit 37 is provided with a normal print mode and a quiet print mode capable of printing images with less noise than the normal print mode. The recording unit 37 switches between these modes according to instructions from the CPU 39. The recording unit 37 is also capable of performing monochrome printing and can form images using only a specified color of toner according to instruction from the CPU 39.

The operating keys 270 function to input instruction signals into the device (the CPU 39 and the like) based on operations by the user in order to perform such operations as entering destination data, specifying a destination, and inputting or selecting memo data.

The LCD 274 functions as a display device for displaying various messages and the like, including error messages and, messages for guiding the user steps of an operation. The LCD 274 of the present embodiment also functions as a touch panel. When the user is specifying a destination for facsimile data or entering destination data, the LCD 274 displays one-touch keys and acquires and inputs user-inputted data into the device.

The modem 89 functions to transmit and receive facsimile data between the external facsimile device 23 connected to the public communication network via the circuit controller 3 and the splitter 8. The circuit controller 3 functions to transmit dialing signals to the public communication network, to answer calling signals from the public communication network, and the like. For example, the circuit controller 3 connects to and can communicate with the external facsimile device 23 via the public communication network.

The PC interface 24 is employed when connecting a personal computer to the facsimile device 1 via a parallel interface or the like and functions to receive code data and the like from the personal computers 13 and 14. The e-mail controller 91 transmits and receives facsimile data via email by transmitting and receiving e-mail between an external communication device connected to the Internet.

In other words, the e-mail controller 91 converts binary image data in a fax format, which was encoded by the encoder 85, into text-coded image data, and adds header data including the e-mail address for the transmission destination and the like to the converted image data. In this manner, the e-mail controller 91 converts the image data in a fax format into image data in an e-mail format that can be transmitted as e-mail. Similarly, the e-mail controller 91 converts image data in an e-mail format received via the Internet and the communication module 5 back to image data in a fax format. The image data converted back in a fax format in this manner is then decoded by the decoder 87 so that the recording unit 37 can output, and the recording unit 37 prints out the data on recording paper.

The function expansion interface 93 is a serial interface, such as AIO (Analog Input/Output) or RS232C. The separate communication module 5 including the router controller 101 can be detachably connected to the function expansion interface 93. The communication module 5 is accommodated in the outer case 25 of the facsimile device 1 as shown in FIG. 3 such that the communication module 5 can be placed and removed as needed.

The communication module 5 includes the router controller 101, a hub 103, an IP telephone unit 105, a wireless processing unit 107, a web printing unit 110, an interface connecting terminal 109 connected to the router controller 101, and the like. The communication module 5 is connected to the function expansion interface 93 via the interface connecting terminal 109.

The router controller 101 is for transmitting and receiving IP packets between a communication device on the Internet via the ADSL modem 9, and functions as a broadband router well known in the art, having an IP masquerade function and a routing function. Using the IP masquerade function, the router controller 101 can convert both ways between a private IP address used on a LAN and a global IP address used on a WAN (the Internet in the present embodiment). Using the routing function, the router controller 101 can connect a terminal on the LAN end to a communication device on the WAN end (the web server 21) to perform bi-directional communications.

For example, by transmitting and receiving data with the IP telephone unit 105, the wireless processing unit 107, and the web printing unit 110 via the hub 103, the router controller 101 can connect the IP telephone unit 105, the wireless processing unit 107, and the web printing unit 110 to the Internet via the ADSL modem 9 for performing bi-directional communications.

Further, by communicating with the LAN terminals 13 through 17 on the LAN connected to the LAN connection port 7 via the hub 103, the router controller 101 can connect the LAN terminals 13 through 17 to the Internet for performing bi-directional communications. In other words, the router controller 101 controls communication routes and transmits data received from the web server 21 to the destination LAN terminals 13 through 17 for example.

In addition, the router controller 101 can communicate with the CPU 39 of the main unit 2 via the function expansion interface 93. In other words, the LAN terminals 13 through 17, the IP telephone unit 105, the wireless processing unit 107, and the web printing unit 110 can communicate bi-directionally with the CPU 39 of the main unit 2 via the router controller 101 and the function expansion interface 93. For example, if the CPU 39 acquires print code data from the personal computer 13 or 14 on the LAN via the router controller 101, then the CPU 39 executes the printer function program, calls the recording unit control program 81c within this program, and controls the recording unit 37 to form images based on the data.

The IP telephone unit 105 connected to the router controller 101 via the hub 103 is configured to store voice signals in IP packets and execute voice communications (a call) with an external IP telephone via the Internet.

The wireless processing unit 107 functions to perform wireless communications between an external wireless communication device and the facsimile device 1. The wireless processing unit 107 can connect an external wireless communication device to the components in the facsimile device 1 for performing bi-directional communications using a wireless connecting method that conforms with the Bluetooth standard (close-range wireless communication standard) or the IrDA standard (infrared communication standard). For example, the LAN terminals 13 through 17 can each be connected to the facsimile device 1 by a wired connecting method using the LAN connection port 7 connected to the hub 103. In addition, the LAN terminals 13 through 17 can be connected to the facsimile device 1 by a wireless connecting method using the wireless processing unit 107.

The web printing unit 110 includes a CPU 111, a ROM 113, a RAM 115, a network interface 117, and the like. The web printing unit 110 can connect itself to the Internet or communicate with the CPU 39 of the main unit 2 by communicating with the router controller 101 via the network interface 117.

Figure 6A:
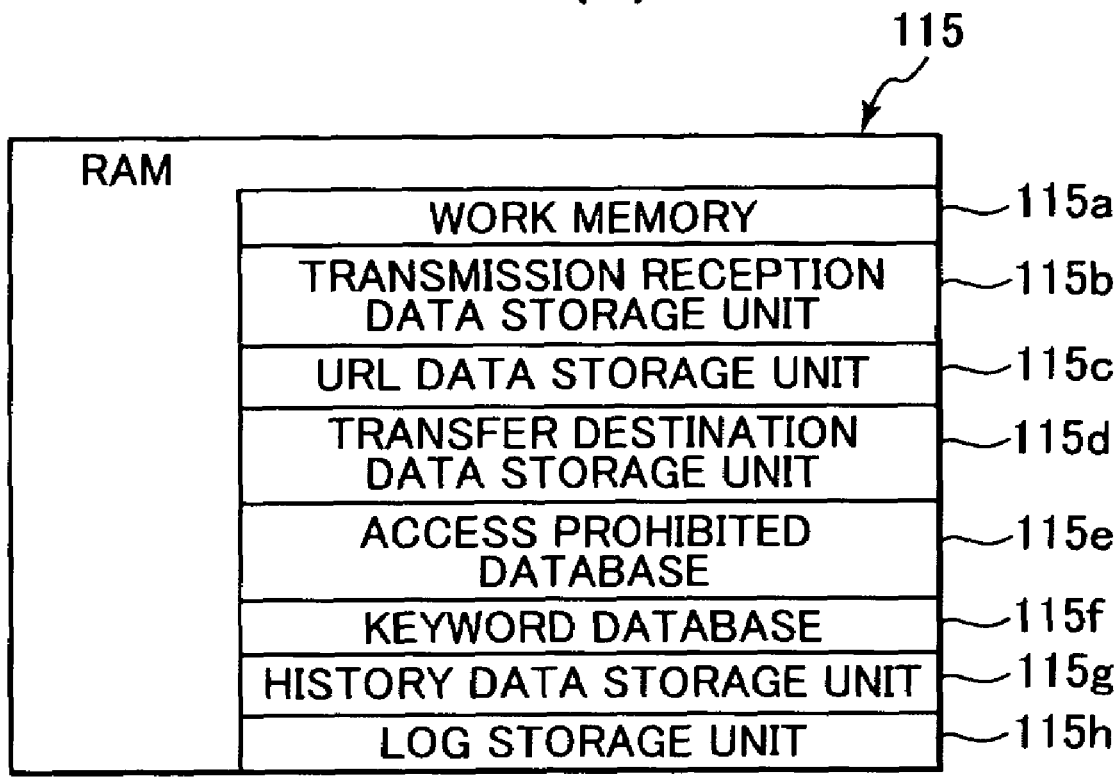
FIG. 6(a) is an explanatory diagram showing data structure in RAM a web printing unit shown in FIG. 4.
Figure 6B:
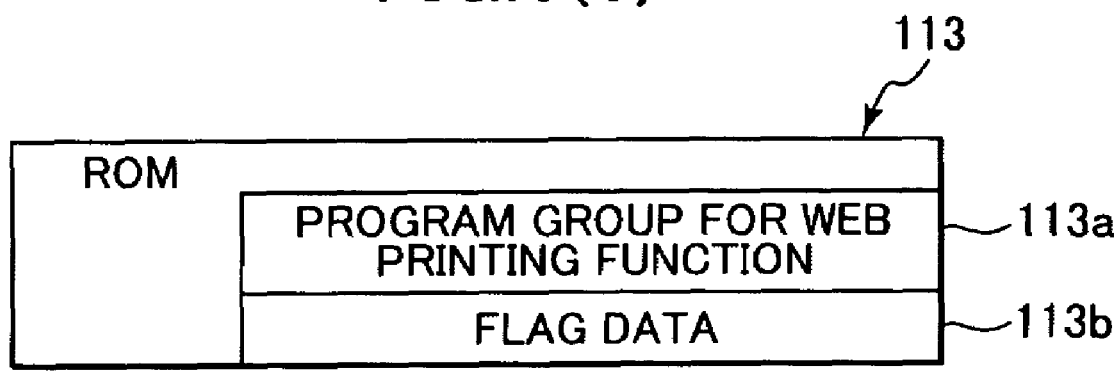
FIG. 6(b) is an explanatory diagram showing data structure in a ROM of the web printing unit.

FIG. 6(a) is an explanatory diagram showing the data structure in the RAM 115 of the web printing unit 110. FIG. 6(b) is an explanatory diagram showing the data structure in the ROM 113.

As shown in FIG. 6(a), the RAM 115 in the web printing unit 110 functions as a work memory 115a, a transmission/reception data storage unit 115b for storing data downloaded from the web server 21 and the like, a URL data storage unit 115c for storing URL (Uniform Resource Locator) data indicating the address of the web server 21, a transfer destination data storage unit 115d for storing transfer destination data regarding the destination to which data is transferred when using a transfer function (described later), an access prohibited database 115e (described later), a keyword database 115f, a history data storage unit 115g, a log storage unit 115h, and the like.

As shown in FIG. 6(c), the URL data storage unit 115c can store a plurality of entries of memo data and scheduler settings data in association with the URL representing the address for accessing the data. In other words, the communication module 5 stores memo data, which the user inputs externally through operations on the operating panel 27 and the like, in association with corresponding URLs into the associations in the URL data storage unit 115c. As is well known in the art, a URL is address data configured of a server address, directory data, filename, and the like.

Next, a process for storing URL-memo data will be described with reference to the flowchart of FIG. 7. The process for storing URL-memo data is executed by the CPU 111 in the web printing unit 110 for storing memo data in association with corresponding URL in the above-described manner.

As shown in FIG. 7, when the process for storing URL-memo data is started, first in S101, the CPU 111 transmits an input instruction to the main unit 2 via the function expansion interface 93, controlling the LCD 274 to display input instruction prompting the user to input a URL and memo data. In S103, the CPU 111 determines whether or not an instruction for storing a URL and memo data was received from the operating panel 27 via the function expansion interface 93. If not (S103:NO), then the process waits until the instruction is received. On the other hand, if so (S103:YES), then in S105, the CPU 111 acquires the URL and the memo data, which have been input from the operating panel 27, from the main unit. Next in S107, the CPU 111 associates the URL with the memo data, and stores the URL and the memo data in the URL data storage unit 115c, and then the process ends.

Here, the memo data is provided to enable the user to quickly determine a desired URL, since it is difficult to determine what home page to access only by the URL display and moreover it is not easy to search for a desired URL because the display area of the LCD 274 is limited.

As shown in FIG. 6(d), the transfer destination data storage unit 115d is configured to store address data for a printer transfer and address data for a personal computer transfer (described later). The transfer destination data storage unit 115d stores a port number along with a private IP address on the LAN as the address data for printer transfers and personal computer transfers.

As shown in FIG. 6(b), the ROM 113 in the web printing unit 110 stores a program group 113a for a web printing function, flag data 113b, and the like. The program group 113a are for acquiring data from the web server 21 and for controlling the recording unit 37 of the facsimile device 1 to print the acquired data. The flag data 113b represents operating conditions of the web printing function.

More specifically, the web printing unit 110 includes a printing function for controlling the recording unit 37 to print images based on data downloaded from the web server 21 via the router controller 101; a saving function for temporarily saving data in the RAM 115; a printer transferring function for transferring downloaded data to the printer 16 (a printer identified by address data stored in the transfer destination data storage unit 115d as the printer transfer destination) connected to the LAN via the LAN connection port 7; a personal computer transferring function for transferring downloaded data to the personal computers 13 and 14 connected to the LAN via the LAN connection port 7; a monochrome printing function for instructing the recording unit 37 to print monochrome images based on downloaded data; a quiet printing function for controlling the recording unit 37 to print images based on the downloaded data in the quiet print mode for suppressing device noise during the printing process; a log saving function for saving log data for various processes executed by the web printing unit 110; and an error data displaying function for displaying error messages on the LCD 274. These functions are implemented by the program group 113a stored in the ROM 113. The functions can be toggled ON and OFF based on flags set in flag setting data stored in the RAM 115. Details will be described below.

The web printing unit 110 stores flag setting data into the RAM 115 according to prescribed conditions in a following manner. FIG. 8 is an explanatory diagram illustrating the data structure of the flag data 113b stored in the ROM 113. According to prescribed conditions, the web printing unit 110 selects one of operating modes shown in FIG. 8. The operating modes include a "normal" operating mode, a "URL access not authorized" operating mode, a "cancel print" operating mode, a "password error" operating mode, a "keyword error" operating mode, a "same content detected" operating mode, a "nighttime print" operating mode, an "answering machine" operating mode, a "large volume monochrome printing" operating mode, an "out-of-paper error" operating mode, and an "out-of-toner error" operating mode.

Then, the web printing unit 110 retrieves function values (hereinafter referred to as "flag values") of the selected operating mode, and stores the retrieved flag values into the RAM 115 as the flag setting data. The web printing unit 110 operates the function (ON) when the flag value is "1" or greater and prevents operation of the function (OFF) when the flag value is "0". The asterisk (*) symbol appearing in FIG. 8 indicates that the flag value stored as the flag setting data prior to selecting the operating mode should not be overwritten.

Next, various processes (the program group 113a) executed by the CPU 111 will be described with reference to FIGS. 9 through 28.

Figure 11:
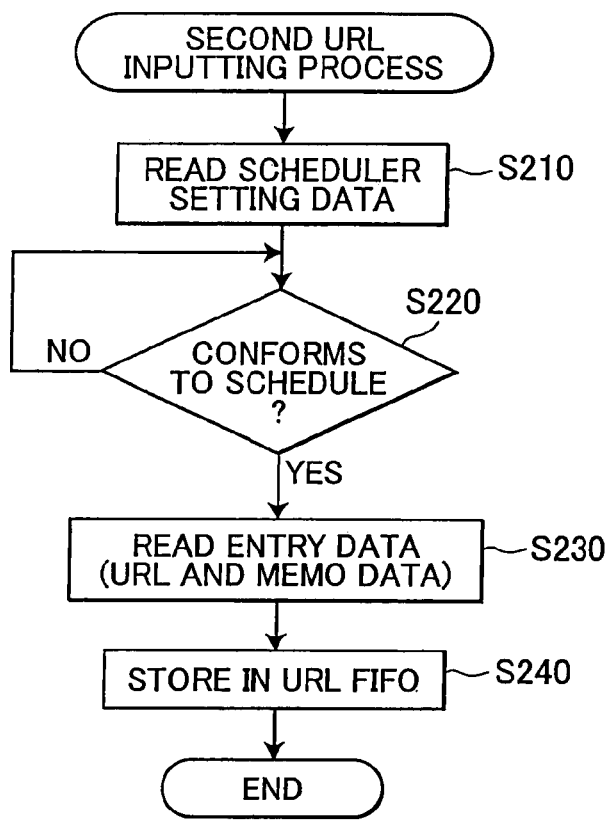
FIG. 11 is a flowchart representing a second URL inputting process according to the present embodiment.
Figure 12:
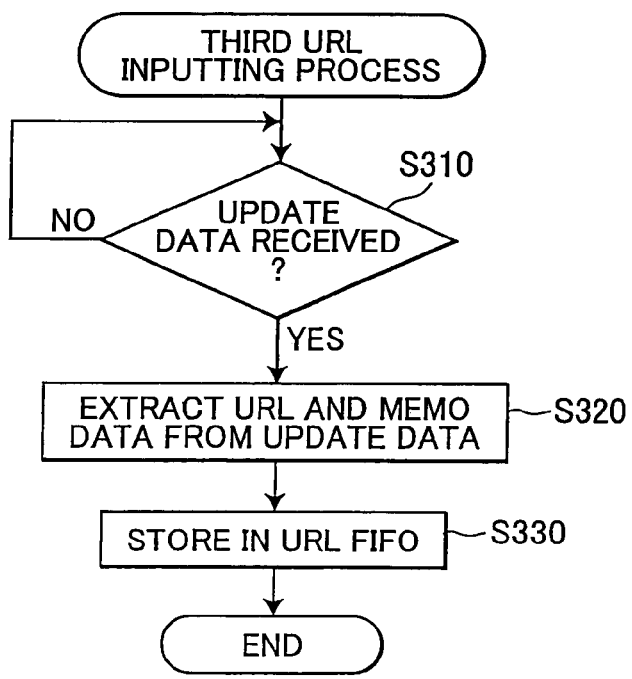
FIG. 12 is a flowchart representing a third URL inputting process according to the present embodiment.

Immediately after the facsimile device 1 is powered ON, the CPU 111 executes the first URL inputting process (FIG. 9), a second URL inputting process (FIG. 11), and a third URL inputting process (FIG. 12).

As shown in FIG. 9, when the first URL inputting process starts, first in S110, the CPU 111 determines whether or not a web print key (not shown) provided on the operating panel 27 has been pressed based on instruction signals transmitted from the operating panel 27. If not (S110:NO), the process waits until the web print key is pressed. If so (S110:YES), then in S120, the web printing unit 110 displays an input prompt on the LCD 274 provided on the operating panel 27. The input prompt enables a user to input a desired URL.

Subsequently, in S121, the CPU 111 determines whether or not an instruction signal to display a URL list was received from the operating panel 27. If not (S121:NO), then in S130, the CPU 111 determines whether or not an input complete signal indicating the user has completed inputting a URL character string was received from the operating panel 27. Here, both the instruction signal and the input complete signal from the operating panel 27 are received via the function expansion interface 93, the router controller 101, the hub 103, and the network interface 117.

If the input complete signal was received in S130 (S130: YES), this means that a URL has been completely inputted at the input prompt, then in S140, data representing the URL inputted by the user is acquired from the main unit 2. Then, the process proceeds to S150, where the data (URL) is stored in the URL FIFO.

FIG. 10 is an explanatory diagram showing the data structure of the URL FIFO. The URL FIFO is a FIFO (first in first out) storage unit storing entries of URLs and used to access the web server 21 at each URL in order of entry to acquire data on the web server 21. The URL FIFO is provided in the work memory 115a and stores URLs in association with corresponding memo data. After the URL and memo data have been entered into the URL FIFO, the CPU 111 ends the first URL inputting process.

On the other hand, if the CPU 111 determines in S121 that the instruction signal for displaying a URL list was received (S121:YES), then in S123, the CPU 111 retrieves the URL and memo data from the URL data storage unit 115c and a log storage unit 115h (described later), and displays a list of this URL and memo data on the LCD 274. This list is displayed approximately in the format shown in FIG. 6(c).

Next in S125, the CPU 111 determines whether or not a selection complete signal was received from the operating panel 27. The selection complete signal indicates that a URL was selected from the list. If not (S125:NO), then the process waits until the selection complete signal is received. If so (S125:YES), then in S127, the CPU 111 extracts selection data relating to the selected URL from the operating panel 27. The process proceeds to S150, where the CPU 111 stores the selected URL and memo data in the URL FIFO, and then the first URL inputting process ends.

Next, the second URL inputting process will be described with reference to the flowchart of FIG. 11. When the second URL inputting process starts, first in S210, the CPU 111 retrieves scheduler setting data from the URL data storage unit 115c. Next in S220, the CPU 111 determines whether or not the scheduler setting data conforms to the current date and time.

For example, scheduler setting data stored in association with the topmost URL in FIG. 6(c) indicates that data is to be obtained from the web server 21 on the 15$^{th}$ of each month. Hence, if the CPU 111 compares the scheduler setting data (data representing the date) with the current date and time, and determines that the two match, then the CPU 111 determines that there is a URL conforming to the data acquisition schedule (S220:YES).

Similarly, scheduler setting data stored in association with the URL of the second entry in FIG. 6(c) indicates that data is to be acquired from the web server 21 on Thursday of each week. If the CPU 111 compares this scheduler setting data (data indicating the day of the week) with the current date and time (the current day of the week), and determines the two days of the week match, then the CPU 111 determines that there is a URL conforming to the data acquisition schedule (S220:YES).

Further, settings data stored in association with the URL of the third entry in FIG. 6(c) indicates that data is to be acquired from the web server 21 everyday at 10:00. In S220, the CPU 111 compares the scheduler setting data to the current date and time. If the two times match, then the CPU 111 determines that there is a URL conforming to the data acquisition schedule (S220:YES).

In the process described above, the CPU 111 compares all scheduler setting data stored in the URL data storage unit 115c to the current date and time.

If the CPU 111 determines in S220 that a URL matches the current date and time in the above-described manner (S220: YES), then the process proceeds to S230. On the other hand, if there is no URL that matches the current date and time (S220:NO), then the operation of S220 is repeatedly executed until a URL conforming to the current date and time appears.

In S230, the URL is retrieved from the URL data storage unit 115c, and in S240, the URL and memo data are stored in the URL FIFO. Then, the present process ends. After ending the process, the CPU 111 again executes the second URL inputting process.

Next, the third URL inputting process will be described with reference to the flowchart of FIG. 12.

When the third URL inputting process starts, first in S310, the CPU 111 determines whether or not update data for the web server 21 is received from an external administrative server via the router controller 101. This process assumes that an administrative server exists for managing update data for the web server 21. By pre-recording settings of a URL for which provision of update data is desired on the administrative server, update data will be transferred from the administrative server each time data on the web server 21 corresponding to that URL is updated.

If the CPU 111 determines that update data has been received (S310:YES), then the process proceeds to S320. On the other hand, if not (S310:NO), then the process waits until a positive determination is made in S310. In S320, the CPU 111 extracts the URL and memo data for the web server 21 from the received update data, and in S330, the CPU 111 stores the URL and memo data extracted from the update data into the URL FIFO. Then, the present process ends. As with the first and second URL inputting processes described above, after ending the third URL inputting process, the CPU 111 again executes the third URL inputting process. By executing the second and third URL inputting processes in the present embodiment, the communication module 5 automatically acquires data on the web servers of the registered URLs (the URLs stored in the URL data storage unit 115c or the URLs recorded on the administrative server) at prescribed intervals (on a prescribed date and time or when update data is acquired).

Next, a web data outputting process will be described with reference to the flowchart of FIG. 13. The web data outputting process is executed by the CPU 111 after the power is turned ON.

When the web data outputting process starts, first in S410, the CPU 111 determines whether or not a web printing function stop command has been input. Here, the web printing function stop command indicates to stop the web printing function and can be input by a user pressing a web printing function stop key provided on the operating panel 27. If so (S410:YES), then the present process ends. On the other hand, if not (S410:NO), then the CPU 111 determines in S420 whether or not a URL is being stored in the URL FIFO.

If not (S420:NO), then the process returns to S410. If so (S420:YES), then the CPU 111 executes a communication-output process in S430, and the process returns to S410.

The communication-output process executed in S430 will be described with reference to the flowchart of FIG. 14.

When the communication-output process starts, in S510, the CPU 111 sets flag setting data. More specifically, the CPU 111 retrieves flag data of the "normal" operating mode (FIG. 8) from the ROM 113, and then stores the retrieves flag data in the work memory 115a as the flag setting data.

Then in S520, the CPU 111 reads URL and memo data from the URL FIFO. In S530, the CPU 111 transmits the URL and the memo data to the main unit 2 via the function expansion interface 93, and displays the URL and memo data on the LCD 274. In S540, the CPU 111 executes a process to determine URL access authorization.

The process to determine URL access authorization is executed to prevent data acquisition and printing from URLs stored in the access prohibited database 115e. The access prohibited database 115e stores URLs of web servers 21 for which access is prohibited. Details of the process to determine URL access authorization will be described with reference to the flowchart of FIG. 15.

When the process to determine URL access authorization starts, in S610, the CPU 111 determines whether or not the URL read from the URL FIFO has been checked against all URLs stored in the access prohibited database 115e (FIG. 6(a)). If so (S610:YES), then the present process ends. If not (S610:NO), then in S620, the CPU 111 reads a URL that has not be checked against from the access prohibited database 115e. In S630, the CPU 111 determines whether or not the URL read in S620 matches to the URL read in S520. If not (S630:NO), then the process returns to S610, where the CPU 111 again determines whether or not the URL read from the URL FIFO has been checked against all URLs stored in the access prohibited database 115e.

If it is again determined in S610 that the URL from the URL FIFO has not been checked against all URLs in the access prohibited database 115e (S610:NO), then in S620 the CPU 111 reads the next URL from the access prohibited database 115e, and performs a comparison with this URL in S630.

If it is determined in S630 that the URL read from the URL FIFO matches a URL stored in the access prohibited database 115e (S630:YES), this means that acquiring and printing the data at this URL is prohibited, and in S640, the CPU 111 reads flag data for the "URL access not authorized" operating mode (FIG. 8), and overwrites the flag setting data in the work memory 115a. Then, the present process ends.

That is, if the CPU 111 determines in S630 that the data to be downloaded is data not authorized for acquisition and printing (S630:YES), then in S640 the CPU 111 changes the flag value of the printing function from "1" to "0" by overwriting the flag setting data for the "normal" operating mode written in S510 with the flag data for the "URL access not authorized" operating mode, thereby turning off the printing function. In this way, it is possible to determine whether data on the web server 21 at a URL read from the URL FIFO cannot be printed prior to acquiring the data. Here, the URL check performed in S630 can attempt to match all data in the URLs or only a portion of the URLs, such as the server address, or check for the existence of an upper-level directory keyword.

Figure 14:
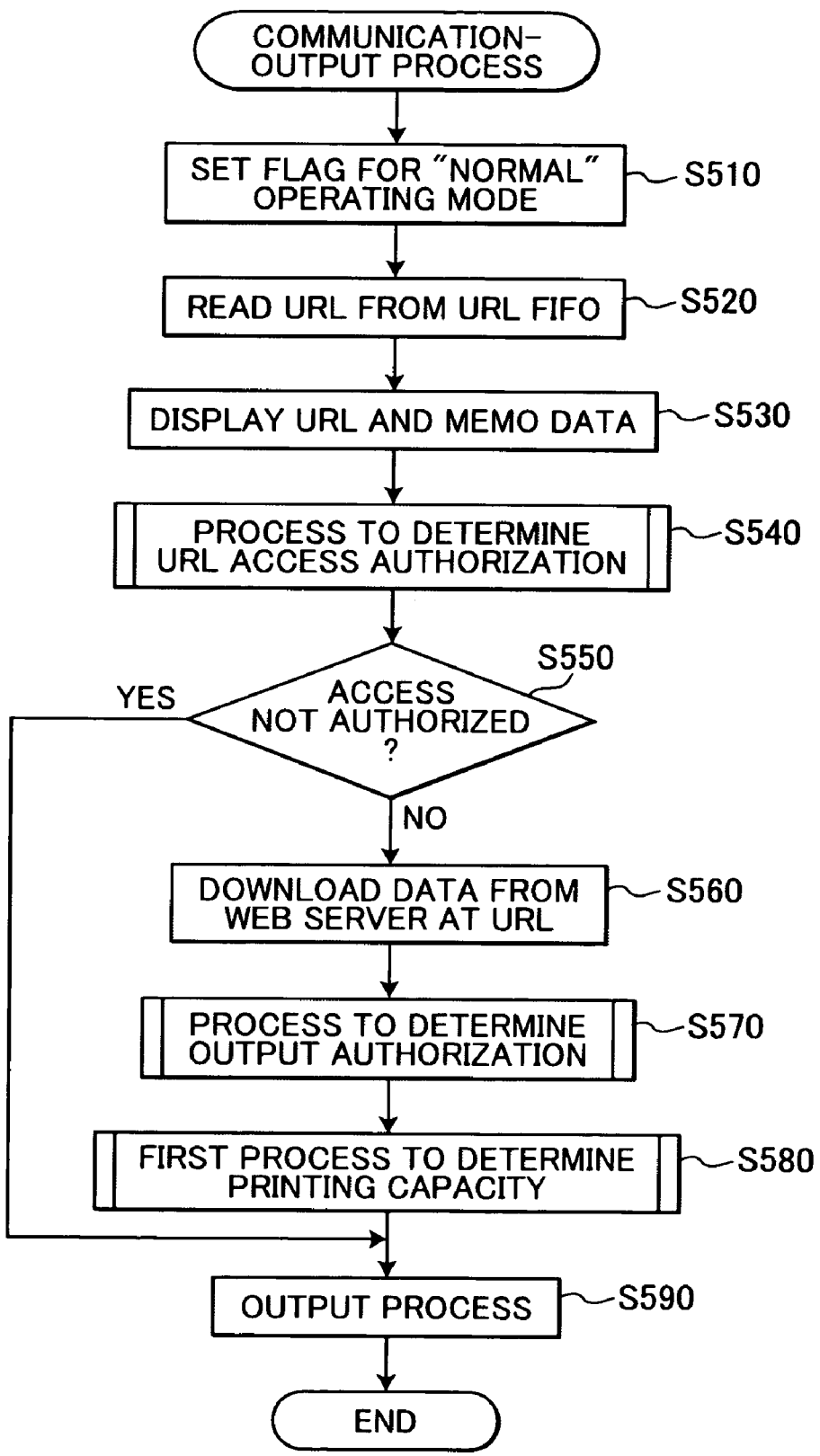
FIG. 14 is a flowchart representing a communication-output process according to the present embodiment.
Figure 15:
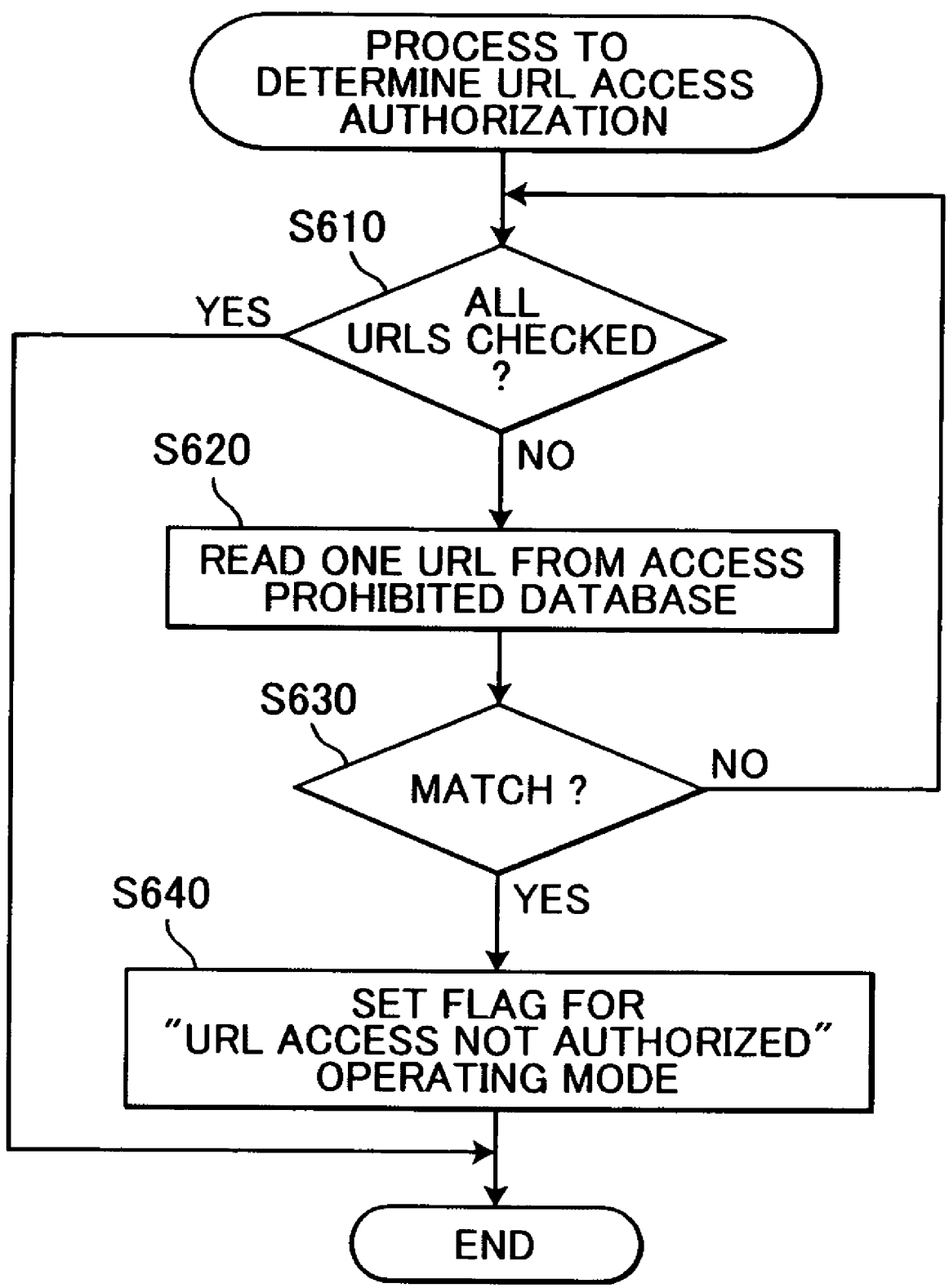
FIG. 15 is a flowchart representing a process to determine URL access authorization according to the present embodiment.

After ending the process to determine URL access authorization of FIG. 15 in S540 of the communication-output process of FIG. 14, the CPU 111 determines in S550 whether or not the flag data for the "URL access not authorized" operating mode has been set as the flag setting data. If so (that is, if the CPU 111 determines that access is prohibited) (S550:YES), the CPU 111 skips the processes in S560 through S580, and the process jumps to S590. On the other hand, if not (that is, if that access is not prohibited) (S550:NO), then in S560, the CPU 111 downloads data specified by the URL from the web server 21 via the router controller 101.

After the download is completed in S560, the CPU 111 executes a process to determine output authorization in S570 and a process to determine time output authorization in S580, and then the process proceeds to S590. Details of the processes executed in S570 and S580 will be described.

Figure 16:
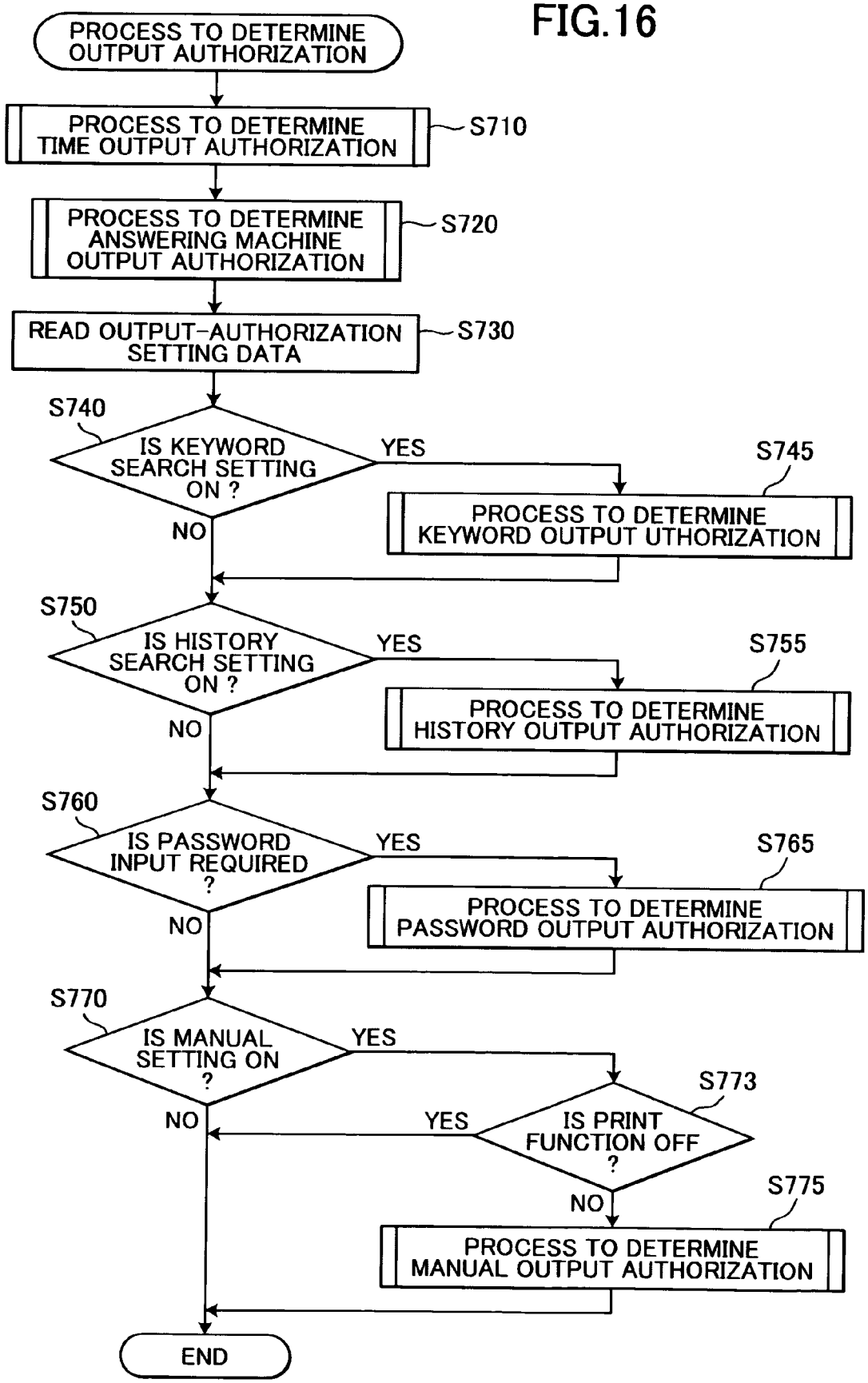
FIG. 16 is a flowchart representing a process to determine output authorization according to the present embodiment.
Figure 17:
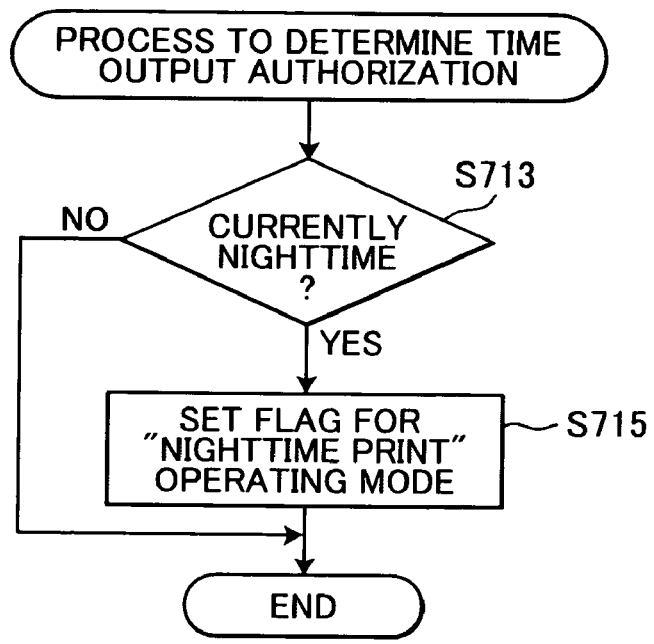
FIG. 17 is a flowchart representing a process to determine time output authorization according to the present embodiment.

First, the process to determine output authorization executed in S570 will be described with reference to the flowchart of FIG. 16. As shown in FIG. 16, when the process to determine output authorization starts, in S710, the CPU 111 executes a process to determine time output authorization. As shown in the flowchart of FIG. 17, when the process to determine time output authorization is started, first in the S713, the CPU 111 determines whether or not the current time is nighttime by comparing time predefined as nighttime to the current time. If not (S713:NO), then the present process ends. On the other hand, if so (S713:YES), then in S715, the CPU 111 reads flag data for the "nighttime print" operating mode from the ROM 113 (FIG. 8), and sets the quiet printing function to ON by overwriting this flag data with the flag setting data in the RAM 115. Then the process ends.

Figure 18:
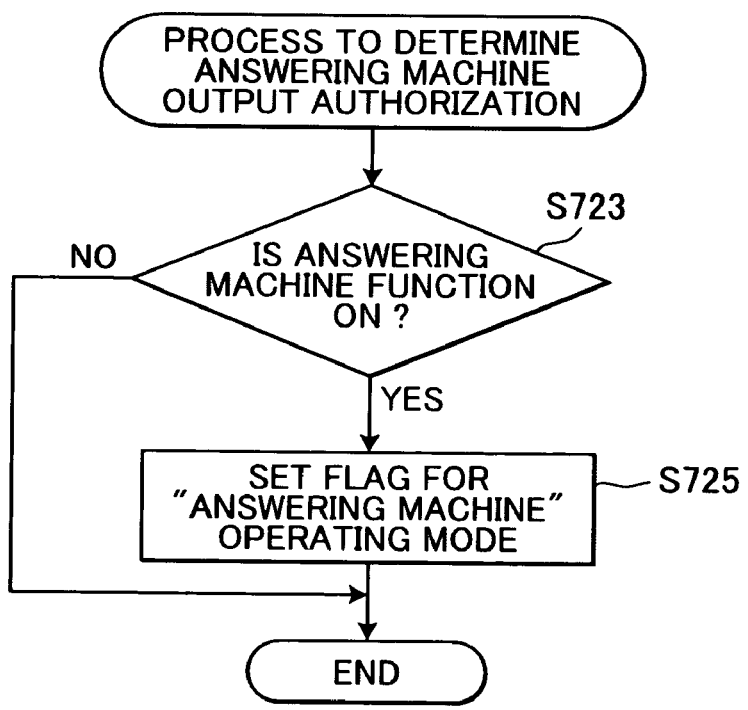
FIG. 18 is a flowchart representing a process to determine answering machine output authorization according to the present embodiment.

After ending the process to determine time output authorization in S710 (FIG. 16), the CPU 111 executes in S720 a process to determine answering machine output authorization. As shown in the flowchart of FIG. 18, when the process to determine answering machine output authorization is started, first in S723, the CPU 111 determines whether or not the answering machine function of the facsimile device 1 is set to ON Here, when the user inputs an instruction to execute the answering machine function by pressing an answering machine key (not shown) provided on the operating panel 27 of the facsimile device 1, the answering machine function for announcing the user's absence in response to a call from an external telephone is set to ON. This answering machine function is maintained in the ON state until the user inputs an instruction to cancel the answering machine function by once again pressing the answering machine key.

If the CPU 111 determines in S723 that the answering machine function is not ON (S723:NO), then the CPU 111 ends the present process. On the other hand, if the CPU 111 determines in S723 that the answering machine function is ON (S723:YES), then in S725, the CPU 111 reads flag data for the "answering machine" operating mode from the ROM 113 (FIG. 8), and overwrites the flag setting data in the RAM 115 with this flag data. Then, the present process ends.

When the flag data of the "answering machine" operating mode is set to the flag setting data in the above-described operation, then the flag value for the printing function is maintained "0" even if the flag setting data is subsequently overwritten in another process. In other words, the CPU 111 of the communication module 5 maintains the printing function in an OFF state by maintaining the flag value for the printing function at "0" while the answering machine function is ON, and determines that images based on downloaded data should not be printed. By overwriting the flag data for the "answering machine" operating mode with the flag setting data in S725, the CPU 111 also sets the PC transfer function to ON, so that downloaded data will be stored in a recording medium (hard disk or the like) of a personal computer at the transfer destination.

Figure 19:
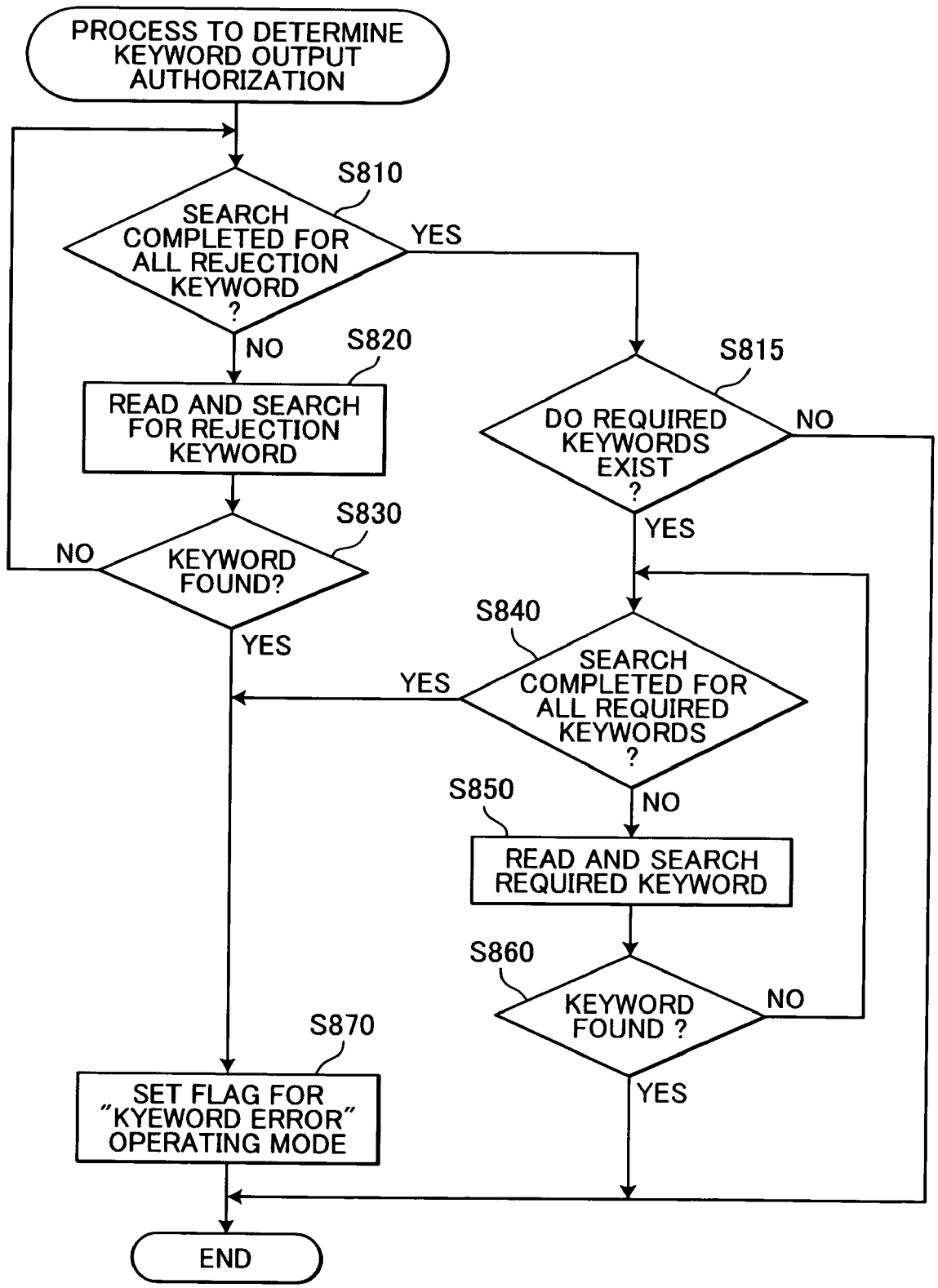
FIG. 19 is a flowchart representing a process to determine keyword output authorization according to the present embodiment.
Figure 20:
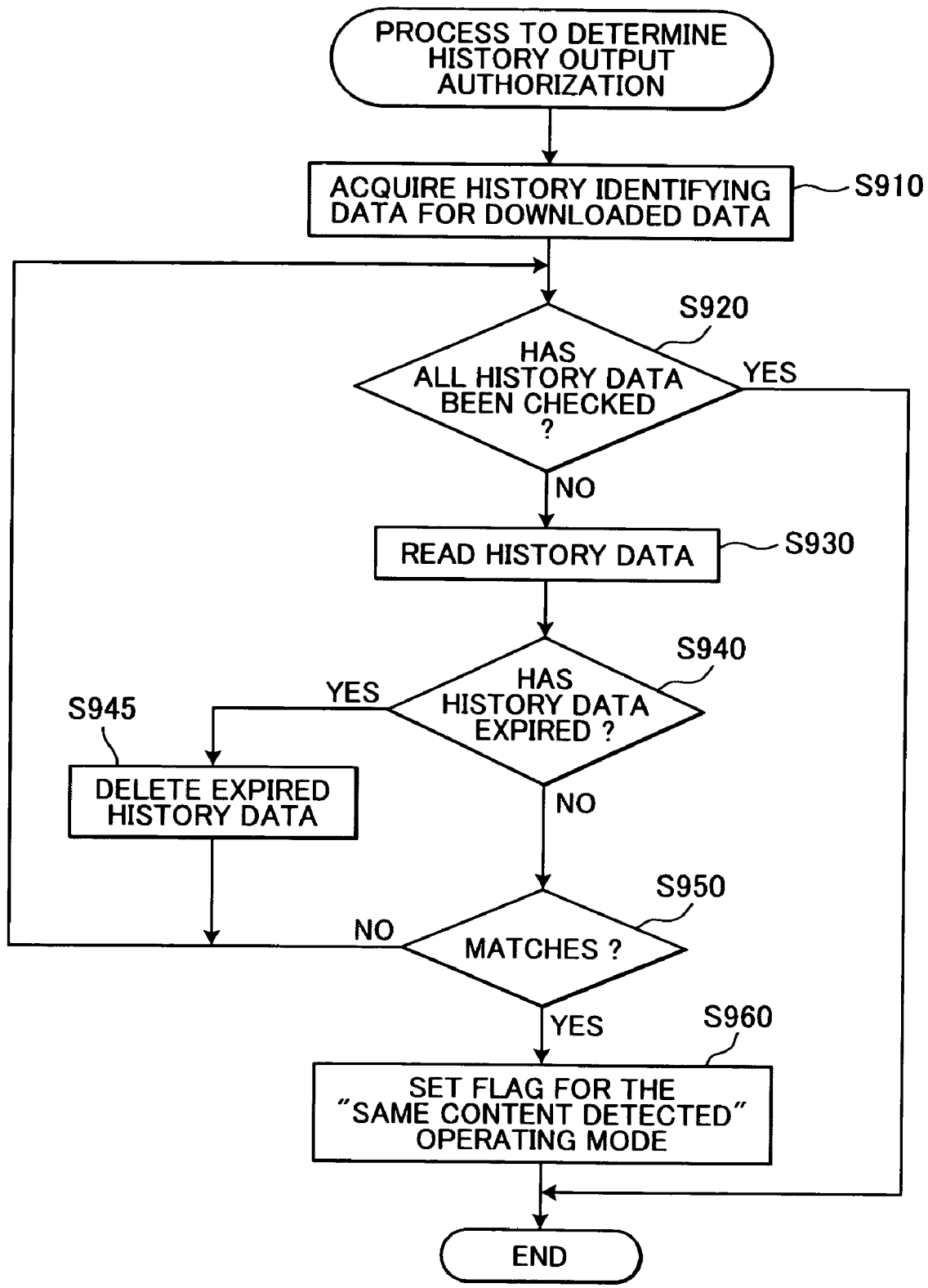
FIG. 20 is a flowchart representing a process to determine history output authorization according to the present embodiment.

After ending the process to determine answering machine output authorization in S720 of FIG. 16, the process proceeds to S730, where the CPU 111 reads output-authorization setting data from the RAM 115. The output-authorization setting data includes primarily a keyword search setting data, a history search setting data, and a manual setting data. The keyword search setting data represents whether or not to conduct a process to determine keyword output authorization (FIG. 19). The history search setting data represents whether or not to perform a process to determine history output authorization (FIG. 20). The manual setting data represents whether or not to perform a process to determine manual output authorization. The user can overwrite the output-authorization setting data by performing operations on the operating panel 27.

After S730, in S740 the CPU 111 determines whether or not the keyword search setting is ON based on the output-authorization setting data. If not (S740:NO), then the process proceeds to S750. If so (S740:YES), then in S745, the CPU 111 executes the process to determine keyword output authorization.

The process to determine keyword output authorization is for identifying data content based on keywords stored in the keyword database 115f. The keyword database 115f stores both rejection keywords for identifying downloaded data with content that should not be printed and required keywords for identifying downloaded data with content that should be printed.

As shown in FIG. 19, when the process to determine keyword output authorization starts, first in S810, the CPU 111 determines whether or not a search has been conducted for all rejection keywords. If not (S810:NO), then in S820, the CPU 111 reads one rejection keyword not yet searched for, and searches for this rejection keyword in data downloaded from the web server 21.

Next in S830, the CPU 111 determines whether or not the rejection keyword was found in the data. If the rejection keyword was found (S830:YES), this means that the downloaded data is of a type that should not be printed. Then the process proceeds to S870, where the flag data for the "keyword error" operating mode (FIG. 8) is read from the ROM 113, and the print function is set to OFF and the PC transfer function is set to ON by overwriting this flag data with the flag setting data in the RAM 115. Then, the process to determine keyword output authorization ends.

If the CPU 111 determines in S830 that the rejection keyword was not found (S830:NO), then the process returns to S810. If the CPU 111 determines in S810 that searches have been made for all rejection keywords (S810:YES), then in S815, the CPU 111 determines whether or not required keywords are stored in the keyword database 115f. If not (S815: NO), then the process to determine keyword output authorization ends without overwriting the flag setting data. On the other hand, if so (S815:YES), then the CPU 111 determines in S840 whether or not a search has been performed on all required keywords. If not (S840:NO), then in S850, the CPU 111 reads one required keyword that has not been searched for from the keyword database 115f, and searches the data downloaded from the web server 21 for this required keyword.

Next in S860, the CPU 111 determines in S860 whether or not the required keyword was found in the downloaded data. If not (S860:NO), then the process returns to S840. If the CPU 111 determines in S840 that the downloaded data has been searched for all required keywords (S840:YES), then the process proceeds to S870. If the CPU 111 determines in S860 that the required keyword was found (S860:YES), then the process to determine keyword output authorization ends without resetting the flag setting data in S870.

After completing the process to determine keyword output authorization in S745 (FIG. 16), the process proceeds to S750, where the CPU 111 determines whether or not the history search setting is set to ON based on the output-authorization setting data. If not (S750:NO), then the process advances to S760. If so (S750:YES), then in S755, the CPU 111 executes a process to determine history output authorization.

FIG. 20 is a flowchart represents the process to determine history output authorization. The process to determine history output authorization is for determining whether or not data downloaded from the web server 21 has already been printed, that is, whether or not the data is of a type corresponding to an image printed by the recording unit 37 previously. This determination is made based on history stored in the history data storage unit 115g (FIG. 6). The history data storage unit 115g stores, for each printed data, a source URL, a data amount, issue date and time, and the like.

As shown in FIG. 20, when the process to determine history output authorization is started, first in S910, the CPU 111 acquires history identifying data from the downloaded data. The history identifying data may be, for example, a source URL of data, a data amount of downloaded data, issue date and time of data, and the like.

Next in S920, the CPU 111 determines whether or not all history data stored in the history data storage unit 115g has been checked against the history identifying data. If so (S920: YES), then the process to determine history output authorization ends. If not (S920:NO), then in S930, the CPU 111 reads one entry of history data from the history data storage unit 115g, and the process proceeds to S940.

In S940, the CPU 111 determines whether or not the history data has expired. For example, the CPU 111 determines that the history data has expired if a prescribed period of time has passed since the print date and time of data included in the history data. If the history data is determined to have expired (S940:YES), then in S945, the CPU 111 deletes this history data from the history data storage unit 115g, Subsequently, the process returns to S920.

If the CPU 111 determines in S940 that the history data has not expired (S940:NO), then in S950, the CPU 111 determines whether or not the history data read in S930 matches the history identifying data. If not (S950:NO), then the process returns to S920. On the other hand, if so (S950:YES), this means that the downloaded data has already been printed, and the process proceeds to S960.

In S960, the CPU 111 extracts flag data for the "same content detected" operating mode (FIG. 8), and overwrites the flag setting data in the RAM 115 with this data, thereby turning OFF the print function and turning ON the PC transfer function. Subsequently, the CPU 111 ends the process to determine history output authorization.

After the process to determine history output authorization of FIG. 20 ends, the process proceeds to S760 (FIG. 16). In S760, the CPU 111 determines whether or not a password output is required. That is, the CPU 111 determines whether or not the downloaded data to be outputted includes password data. If the downloaded data does not include password data, then password input is unnecessary (S760:NO), and the process jumps to S770. On the other hand, if the downloaded data includes password data, then password input is necessary (S760:YES), and the process proceeds to S765, where the CPU 111 executes a process to determine password output authorization.

Here, the facsimile device 1 of the present embodiment is configured such that a password can be set for specific types of data in order to switch the printing function ON and OFF. For example, if password data is stored for data identified as data having a required keyword, then in S760 the CPU 111 determines that a password is required and executes the process to determine password output authorization in S765. In addition, it is possible to prompt for password input when data includes adult-oriented content.

Figure 21:
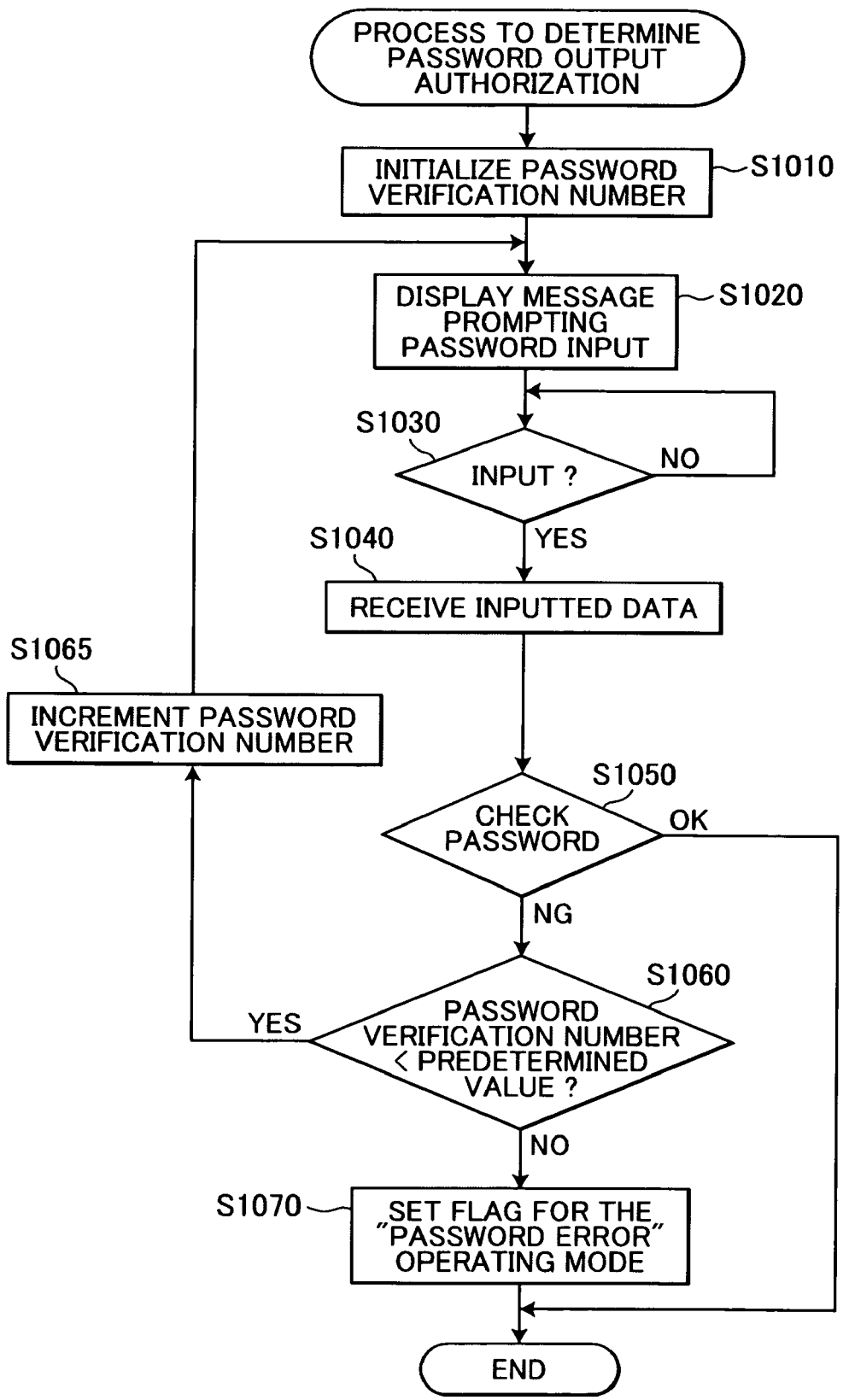
FIG. 21 is a flowchart representing a process to determine password output authorization according to the present embodiment.

FIG. 21 is a flowchart representing the process to determine password output authorization executed in S765 of FIG. 16. As shown in FIG. 21, when this process starts, in S1010, the CPU 111 initializes a password verification number to zero. In S1020, the CPU 111 displays the message on the LCD 274, prompting the user to input a password. In S1030, the CPU 111 determines whether or not the user has input a password through operations on the operating panel 27, based on signals received from the operating panel 27 (operating data).

If not (S1030:NO), the process waits until a password is input. If so (S1030:YES), in S1040, the CPU 111 receives the password via the function expansion interface 93. In S1050, the CPU 111 determines whether the received password matches a password set in the downloaded data. If so (S1050:YES), this means that the user is successfully authorized, and then the CPU 111 ends the process to determine password output authorization. On the other hand, if not (S1050:NO), this means that the user fails authorization. Then in S1060, the CPU 111 determines whether or not the password verification number is less than a predetermined value.

If the password verification number is less than the predetermined value (S1060:YES), then in S1065, the CPU 111 increments the password verification number by 1, and the process returns to S1020. On the other hand, if the CPU 111 determines in S1060 that the password verification number is not less than the predetermined value (S1060:NO), then in S1070, the CPU 111 reads the flag data for the "password error" operating mode (FIG. 8) from the 113, and turns OFF the printing function and turns ON the saving function by overwriting the flag setting data in the RAM 115 with this flag data. Subsequently, the CPU 111 ends the process to determine password output authorization.

After the process to determine password output authorization ends, the process proceeds to S770 of FIG. 16. In S770, the CPU 111 determines whether or not the manual setting is ON based on the output-authorization setting data. If not (S770:NO), then the CPU 111 ends the process to determine output authorization. On the other hand, if so (S770:YES), then in S773, the CPU 111 determines whether or not the print function is OFF. This determination is made by determining whether or not the flag value corresponding to the print function in the flag settings is 0".

Figure 22:
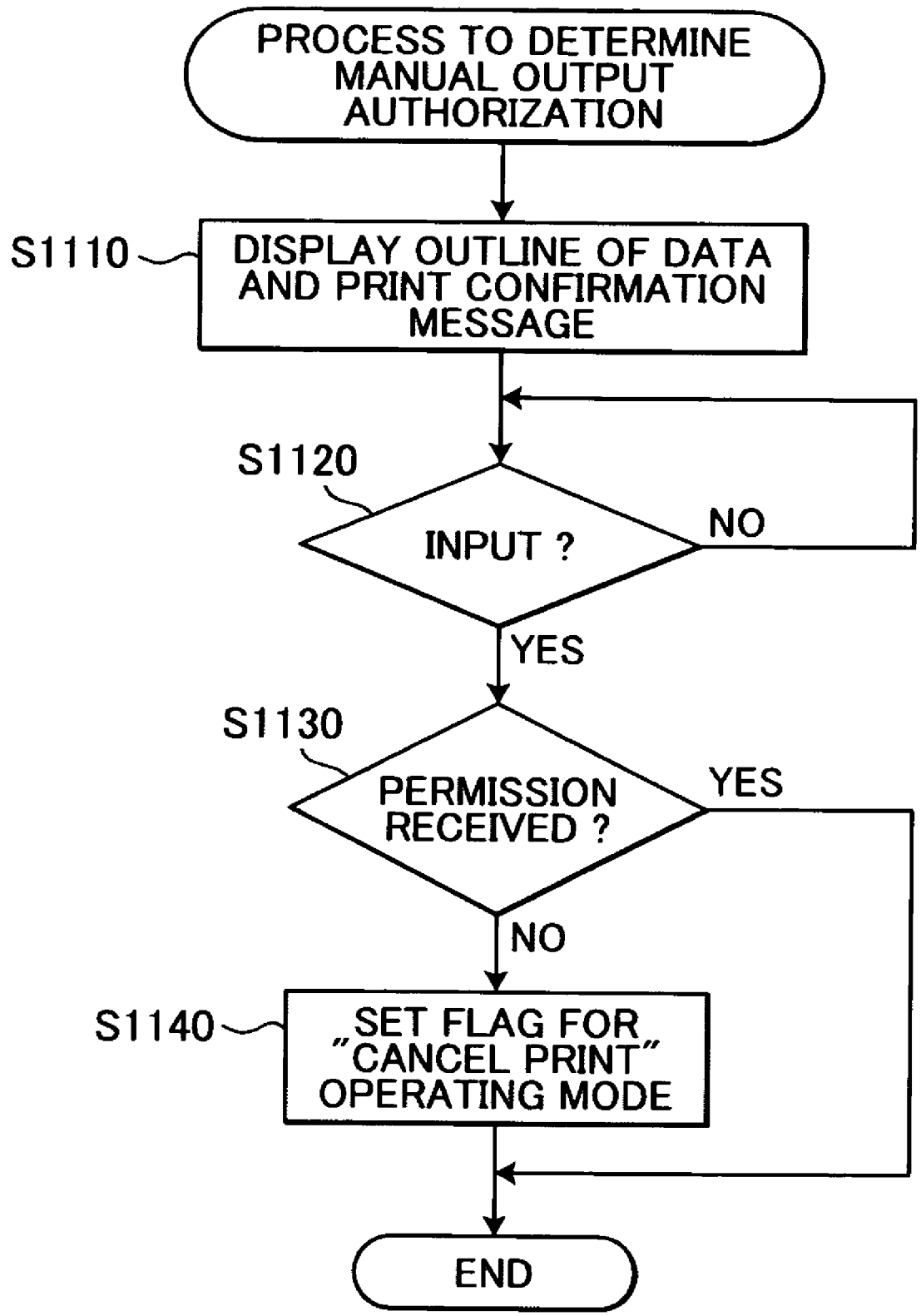
FIG. 22 is a flowchart representing a process to determine manual output authorization according to the present embodiment.

If the CPU 111 determines in S773 that the print function is OFF (that is, the flag value is "0") (S773:YES), then the process to determine output authorization ends. On the other hand, if it is determined in S773 that the print function is not OFF (the flag value is "1") (S773:NO), then the process advances to S775, where the CPU 111 executes a process to determine manual output authorization. FIG. 22 is a flowchart representing the process to determine manual output authorization.

As shown in FIG. 22, when the process to determine manual output authorization starts, first in S1110, the CPU 111 displays, on the LCD 274, an outline of the downloaded data and a print confirmation message prompting the user whether or not to print the downloaded data, by transferring data for displaying the outline data and the print confirmation message on the LCD 274 via the function expansion interface 93. Here, the CPU 111 can display a reduced image representing the downloaded data in the HTML format on the LCD 274 as the outline data or can display the source URL for the data and memo data described above. The CPU 111 can also notify the user of the data content by displaying both types of data at the same time.

Next in S1120, the CPU 111 determines whether or not an instruction signal inputted by the user through operations of the operating panel 27 is received. If not (S1120:NO), the process waits until a positive determination is made in S1120. If so (S1120:YES), then in S1130, the CPU 111 determines whether or not the instruction signal is print authorization signal authorizing the printing process. If the instruction signal is the print authorization signal (S1130:YES), then the present process ends. If the instruction signal is not the print authorization signal (S1130:NO), then in S1140, the CPU 111 reads the flag data for the "print cancel" operating mode (FIG. 8), and turns OFF the print function by overwriting the flag setting data in the RAM 115 with this flag data. Subsequently, the CPU 111 ends the process to determine manual output authorization. When the process to determine manual output authorization ends, the process to determine output authorization of FIG. 16 ends simultaneously.

Figure 23:
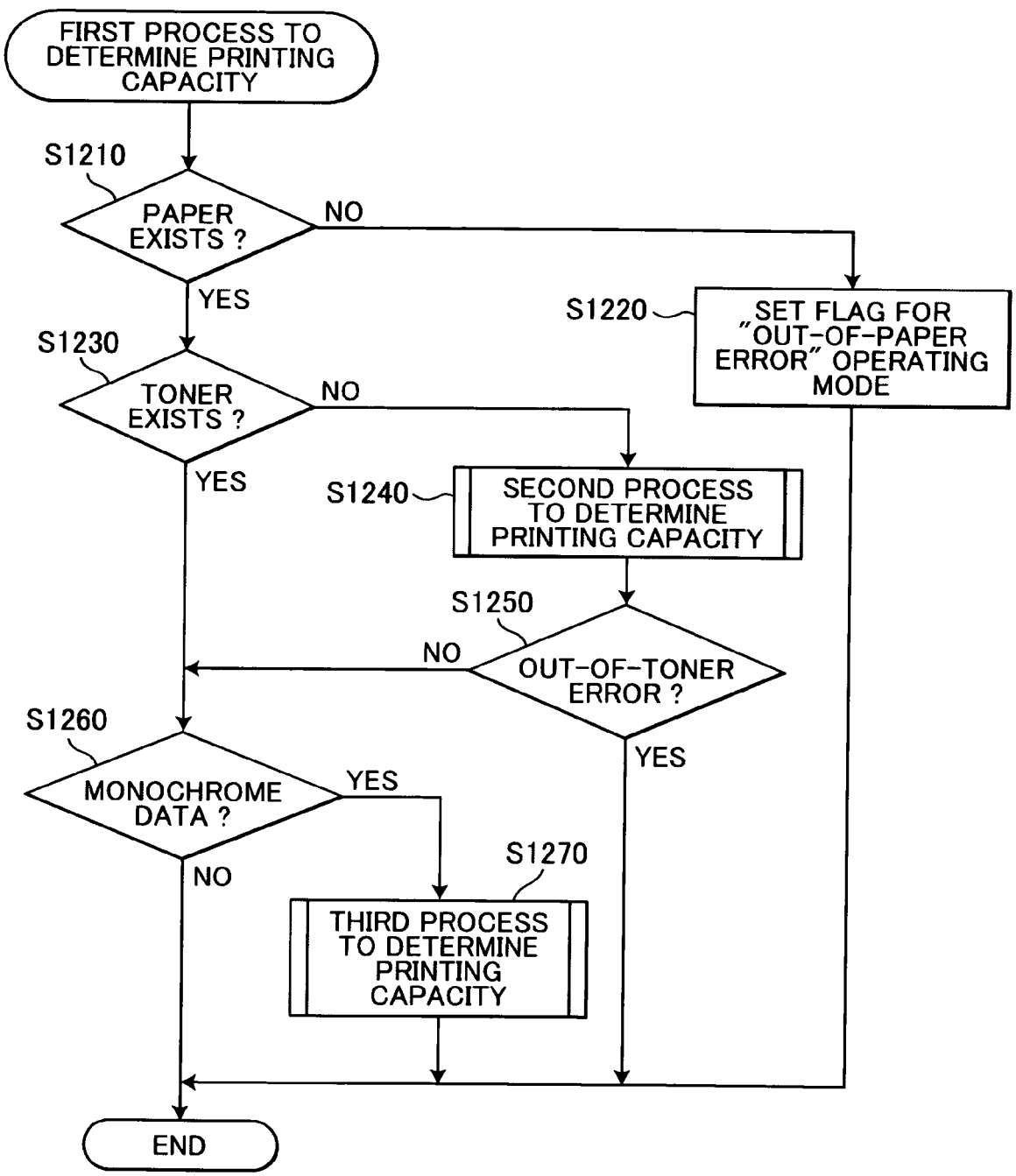
FIG. 23 is a flowchart representing a first process to determine printing capacity according to the present embodiment.

After ending the process to determine output authorization of FIG. 16, the CPU 111 executes a first process to determine printing capacity in S580 of the communication-output process of FIG. 14. FIG. 23 is a flowchart representing the first process to determine printing capacity.

When the first process to determine printing capacity of FIG. 23 starts, first in S1210, the CPU 111 determines whether or not recording paper that can be supplied to the recording unit 37 exists in the first paper tray 29 or the second paper tray 31. If not (S1210:NO), then in S1220, the CPU 111 extracts flag data for the "out-of-paper error" operating mode (FIG. 8) from the ROM 113, and turns OFF the print function by overwriting the flag setting data in the RAM 115 with this flag data. Subsequently, the present process ends.

Figure 24:
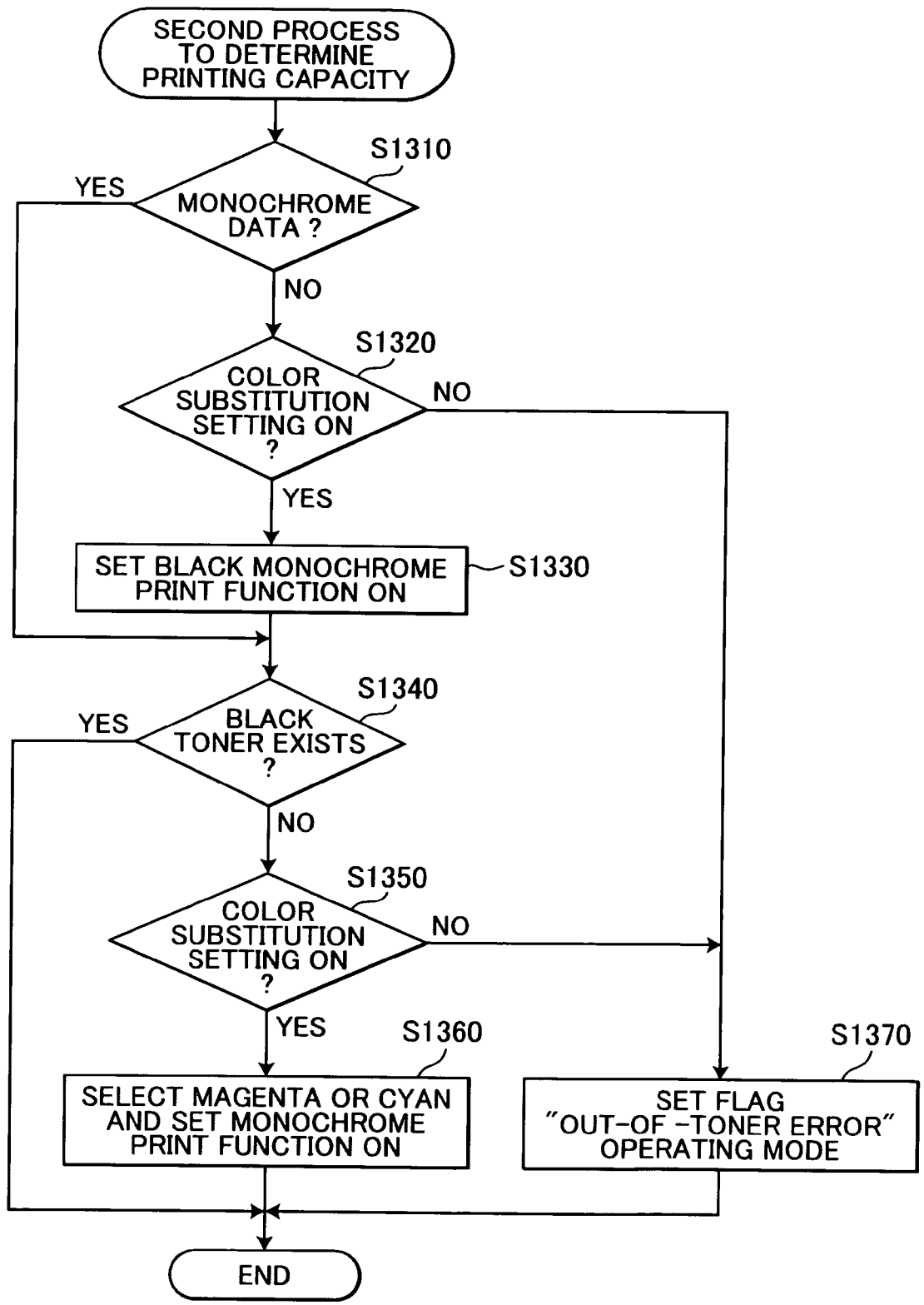
FIG. 24 is a flowchart representing a second process to determine printing capacity according to the present embodiment.

On the other hand, if the CPU 111 determines in S1210 that recording paper exists (S1210:YES), then in S1230, the CPU 111 determines whether or not toner exists for all colors to form an image on recording paper. If so (S1230:YES), then the process advances to S1260. If not (S1230:NO), then the process advances to S1240, where the CPU 111 executes a second process to determine printing capacity. FIG. 24 is a flowchart representing the second process to determine printing capacity.

As shown in FIG. 24, when the second process to determine printing capacity starts, first in S1310, the CPU 111 determines whether or not the downloaded data is monochrome data. If not (S1310:NO), this means that the data is color data, and then in S1320, the CPU 111 determines whether or not the color substitution setting is set to ON based on a color substitution setting data. Here, the color substitution settings data indicates whether or not to operate the monochrome printing function (ON) to print data originally intended to be printed as multicolor images in a single color when there is insufficient toner for one of the cyan, magenta, yellow, or black colors.

If it is determined in S1320 that the color substitution setting is ON (S1320:YES), then in S1330, the CPU 111 sets the flag value for the monochrome printing function in the flag setting data stored in the RAM 115 to "1," thereby turning ON the monochrome printing function. The process then advances to S1340. On the other hand, if it is determined in S1310 that the downloaded data is monochrome data (S1310: YES), then the process advances to S1340.

In S1340, the CPU 111 determines whether or not black toner exists. If so (S1340:YES), then the present process ends. On the other hand, if not (S1340:NO), then in S1350, the CPU 111 determines whether or not the color substitution setting is ON.

If so (S1350:YES), then in S1360, the CPU 111 selects the toner having the greatest remaining amount between magenta and cyan, and sets the flag value for the monochrome printing function in the flag setting stored in the RAM 115 to "2" or "4". In the present embodiment, if the flag value for the monochrome printing function is set to "2", then the monochrome printing function for printing with cyan toner is set to ON. If the flag value for f the monochrome printing function is set to "4", then the monochrome printing function for printing with magenta toner is set to ON. Afterwards, the present process ends.

On the other hand, if it is determined in either S1320 or S1350 that the color substitution setting is not ON (S1310: NO, S1350:NO), the process proceeds to S1370, where the CPU 111 reads the flag data from the "out-of-toner error" operating mode from the ROM 113 (FIG. 8), and turns OFF the printing function by overwriting the flag setting data in the RAM 115 with this flag data. Then, the present process ends.

After ending the second process to determine printing capacity in S1240 of FIG. 23, the process proceeds to S1250, where the CPU 111 determines whether or not the flag data for the "out-of-toner error" operating mode was set in the previous process. If so (S1250:YES), then the first process to determine printing capacity ends. If not (S1250:NO) then the process advances to S1260.

Figure 25:
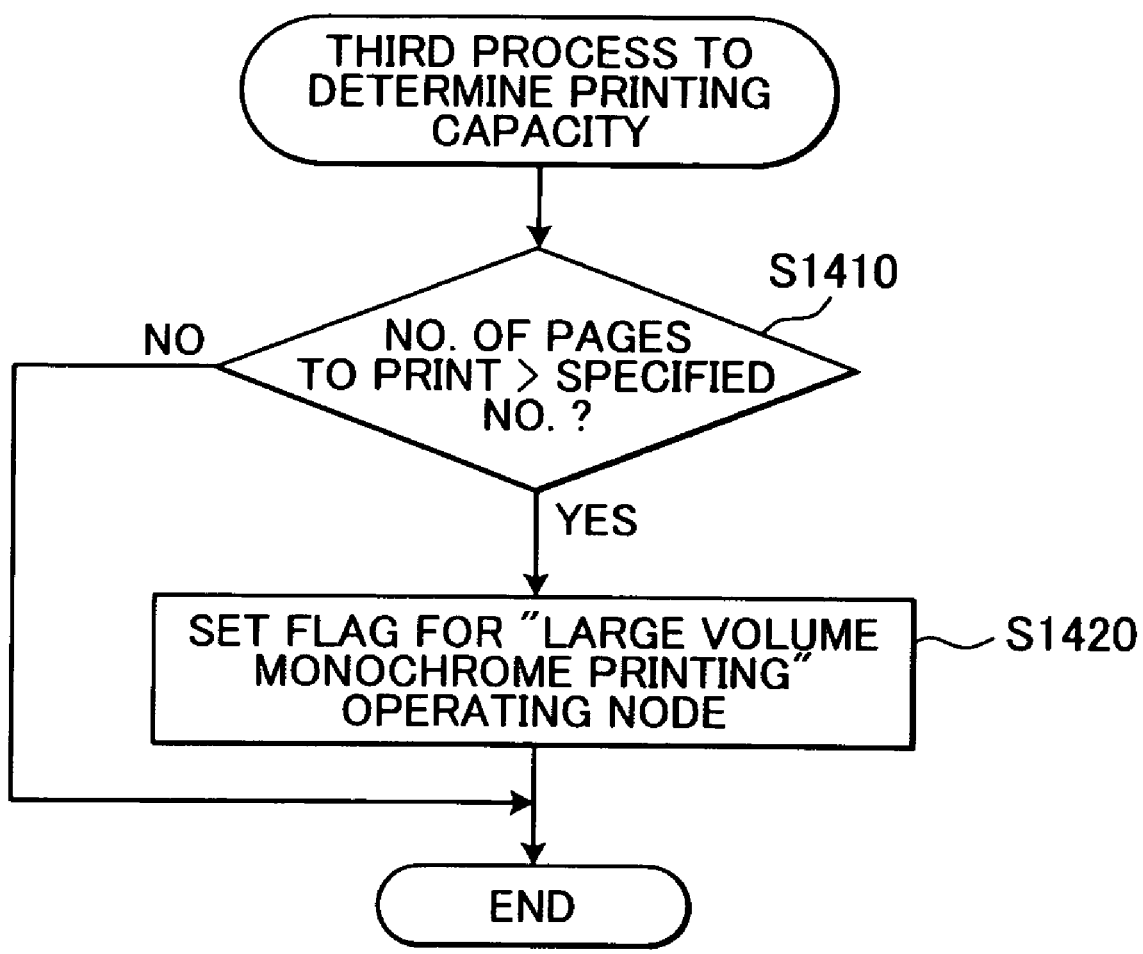
FIG. 25 is a flowchart representing a third process to determine printing capacity according to the present embodiment.

In S1260, the CPU 111 determines whether or not the downloaded data is monochrome data. If not (S1260:NO), then the first process to determine printing capacity ends. If so (S1260:YES), then the process shifts to S1270, where the CPU 111 executes a third process to determine printing capacity. FIG. 25 is a flowchart representing the third process to determine printing capacity.

As shown in FIG. 25, when the third process to determine printing capacity starts, first in S1410, the CPU 111 determines whether or not the number of pages required to print images based on the downloaded data or images exceeds a predetermined value, which has been set based on the printing speed of the recording unit 37.

If not (S1410:NO), then the CPU 111 ends the third process to determine printing capacity. On the other hand, if so (S1410:YES), this means that the downloaded data is of a type that does not conform to the printing capacity (printing speed) of the recording unit 37. Hence, in S1420, the CPU 111 reads the flag data for the "large volume monochrome printing" operating mode from the ROM 113 (FIG. 8), and overwrites the flag setting data stored in the RAM 115 with the flag data, thereby turning OFF the print function and turning ON the printer transfer function. Subsequently, the CPU 111 ends the third process to determine printing capacity. As shown in FIG. 23, after executing the third process to determine printing capacity in S1270, the CPU 111 ends the first process to determine printing capacity simultaneously.

Figure 26:
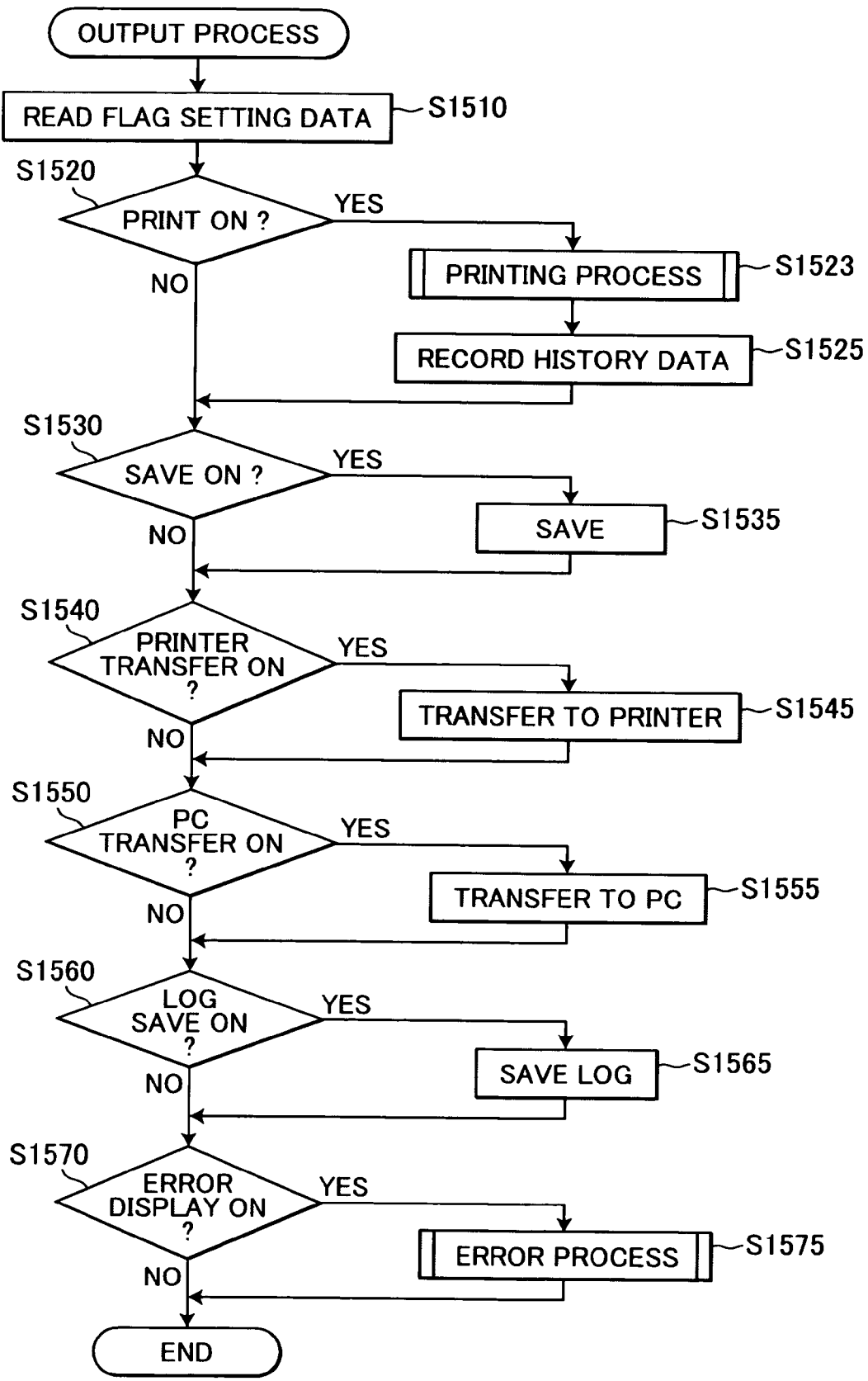
FIG. 26 is a flowchart representing an output process according to the present embodiment.

After ending the first process to determine printing capacity of FIG. 23 in S580 of FIG. 14, then the process proceeds to S590. In S590, the CPU 111 executes an output process. FIG. 26 is a flowchart representing the output process.

Figure 27:
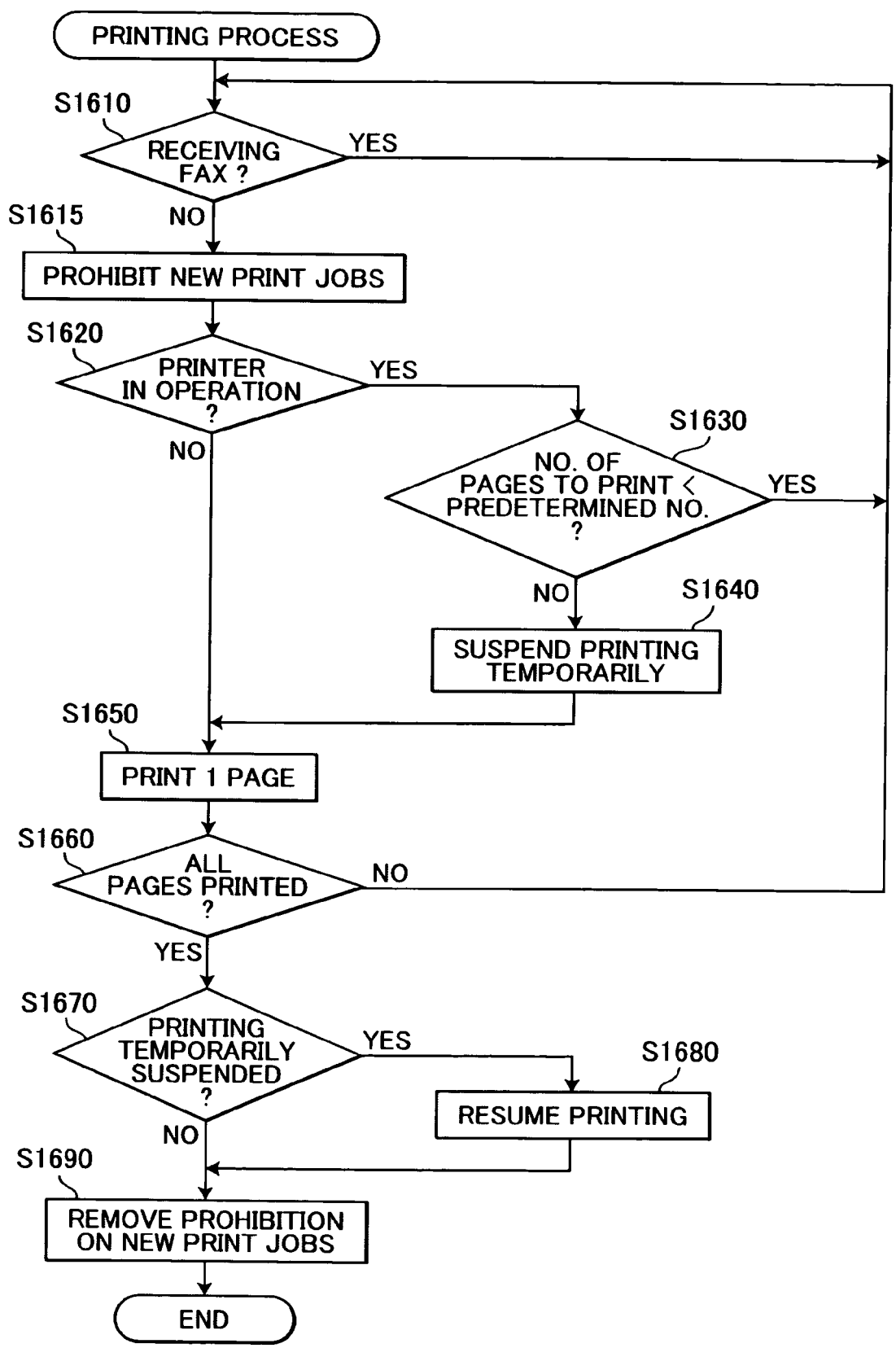
FIG. 27 is a flowchart representing a printing process according to the present embodiment.

As shown in FIG. 26, when the output process starts, first in S1510, the CPU 111 reads the flag setting data from the RAM 115. In S1520, the CPU 111 determines whether or not the downloaded data should be printed based on the flag setting data. In other words, the CPU 111 determines in S1520 whether or not the print function is set to ON (that is, whether the flag value of the print function is "1"). If the CPU 111 determines in S1520 that the print function is ON (S1520: YES), this means that the downloaded data is to be printed, and the process proceeds to S1523, where the CPU 111 executes a printing process. FIG. 27 is a flowchart representing the printing process.

As shown in FIG. 27, when the printing process starts, first in S1610, the CPU 111 determines whether or not the CPU 39 is currently executing the facsimile function program to receive facsimile data via the circuit controller 3. If so (S1610:YES), then the CPU 111 waits until the reception is complete and the facsimile data is printed. By this operation, the facsimile device 1 gives top priority to the facsimile function, since the facsimile function must be operated immediately when facsimile data is received from an external facsimile device.

On the other hand, if the CPU 111 determines in S1610 that the facsimile function is not being operated in the main unit 2 (S1610:NO), then in S1615, the CPU 111 issues an instruction to the CPU 39 to prohibit the printing of new jobs. Next in S1620, the CPU 111 determines whether or not the CPU 39 is currently executing the print function program, controlling the recording unit 37 to print images based on either data received from the personal computer 13, 14 via the LAN and the communication module 5 or data received via the PC interface 24, that is, whether or not a print job is currently being executed in the main unit 2. If so (S1620:YES), then in S1630, the CPU 111 converts the remaining amount of data to be printed into a number of sheets of recording paper to be printed, and determines whether this number of sheets is less than a predetermined number. If the number of sheets is less than the predetermined number (S1630:YES), then the process returns to S1610, and the CPU 111 waits until images based on that data have been printed.

The predetermined number of pages is set to a few pages. In other words, according to the above determination, the facsimile device 1 give priority to operating the printer function over the web printing function only when the remaining data can be printed on a few pages (the remaining number of pages to be printed is less than the predetermined number). In this case, the facsimile device 1 gives priority to the downloaded data, instructing the recording unit 37 to print images based the data received from the personal computers 13 and 14 in order to provide printed materials based on this data to the user quickly.

On the other hand, if the CPU 111 determines in S1630 that the remaining number of pages to be printed is not less than the predetermined number (S1630:NO), then in S1640, the CPU 111 temporarily suspends execution of the printer function after allowing the recording unit 37 to finish printing the current page (one page only). Subsequently, the process advances to S1650.

In S1650, the CPU 111 transmits the downloaded data to be printed to the CPU 39 via the function expansion interface 93, so that the CPU 39 executes the recording unit control program 81c and controls the recording unit 37 to form only one page worth of images based on the downloaded data. With this process, if the number of pages to be printed by the printer function is greater than or equal to the predetermined number (S1630:NO), then the facsimile device 1 places priority on operating the web printing function over the printer function and directs the recording unit 37 to print images based on the downloaded data.

At this time, the CPU 111 references the flag values corresponding to the quiet printing function and the monochrome printing function. If the quiet printing function is set to ON (that is, the flag value for the quiet printing function is "1"), then a quiet printing instruction is transmitted to the CPU 39, and the recording unit 37 is controlled to print the downloaded data in the quiet print mode. If the flag value for the monochrome printing function is "1," then a black printing instruction is transmitted to the CPU 39 and the recording unit 37 is controlled to print the downloaded data only using black toner. Alternatively, if the flag value for the monochrome printing function is "2," then a cyan printing instruction is transmitted to the CPU 39 of the main unit 2 and the recording unit 37 is controlled to print the downloaded data only using cyan toner. If the flag value for the monochrome printing function is "4," then a magenta printing instruction is transmitted to the CPU 39 of the main unit 2 and the recording unit 37 is controlled to print the downloaded data only using magenta toner.

Next in S1660, the CPU 111 determines whether or not all pages of images based on the downloaded data have been printed. If not (S1660:NO), then the process returns to S1610. If so (S1660:YES), then the process advances to S1670, where the CPU 111 determines whether or not printing has been temporarily suspended in the process of S1640 described above. If so (S1670:YES), then in S1680, the CPU 111 cancels the temporary suspension. As a result, the CPU 39 resumes the printing of data that was interrupted. Then, the process proceeds to S1690. In S1690, the CPU 111 issues an instruction to the CPU 39 to clear the prohibition of printing new print jobs, and the printing process ends.

On the other hand, if the CPU 111 determines in S1670 that printing was not suspended (S1670:NO), then the CPU 111 skips the process of S1680, and the process proceeds to S1690. In S1690, the CPU 111 issues an instruction to the CPU 39 to clear the prohibition of printing new print jobs, and the printing process ends.

After ending the printing process of FIG. 27 in S1523 of FIG. 26, the process proceeds to S1525. In S1525, the CPU 111 appends history data indicating the downloaded data, that was printed, into the history data storage unit 115g, and then the process proceeds to S1530.

If the CPU 111 determines in S1520 that the print function is not ON (that is, the flag value of the print function is "0"), then the CPU 111 prohibits the recording unit 37 from printing the downloaded data by executing the next process in S1530 without calling the printing process in S1523.

In S1530, the CPU 111 determines whether or not the saving function is set to ON (that is, whether the flag value corresponding to the saving function is "1"). If so (flag value is "1") (S1530:YES), then in S1535, the downloaded data is saved in the transmission/reception data storage unit 115b, and the process advances to S1540. If the saving function is not ON (S1530:NO), then the process advances to S1540 without executing the saving operation in S1535.

In S1540, the CPU 111 determines whether or not the printer transfer function is set to ON (that is whether the flag value for the printer transfer function is "1"). If the printer transfer function is ON (flag value is "1") (S1540:YES), then in S1545, the downloaded data is transferred via the router controller 101 to the printer 16 at the address stored in the transfer destination data storage unit 115d as the printer transfer destination (FIG. 6(d)). Then, the process proceeds to S1550. On the other hand, if the printer transfer function is not ON (S1540:NO), then the process advances to S1550 without performing the printer transfer process in S1545.

In S1550, the CPU 111 determines whether or not the PC transfer function is set to ON (that is, whether the flag value for the PC transfer function is "1"). If the PC transfer function is ON (S1550:YES), then in S1555, the downloaded data is transferred via the router controller 101 to a personal computer at the address stored in the transfer destination data storage unit 115d as the PC transfer destination (FIG. 6(d)). Then the process proceeds to S1560. On the other hand, if the PC transfer function is not ON (S1560:NO), then the process advances to S1560 without performing the PC transfer process in S1555.

In S1560, the CPU 111 determines whether or not the log save function is set to ON (that is, whether the flag value for the log save function is "1"). If the log save function is ON (S1560:YES), then in S1565, data regarding whether the printing, the saving, the printer transfer, or the PC transfer operations were executed for the downloaded data, data regarding errors, and the like are stored along with the source URL of the downloaded data in the log storage unit 115h as the log. Then, the process proceeds to S1570. On the other hand, if the log save function is not ON (S1560:NO), then the process proceeds to S1570 without performing the log saving process in S1565.

Figure 28:
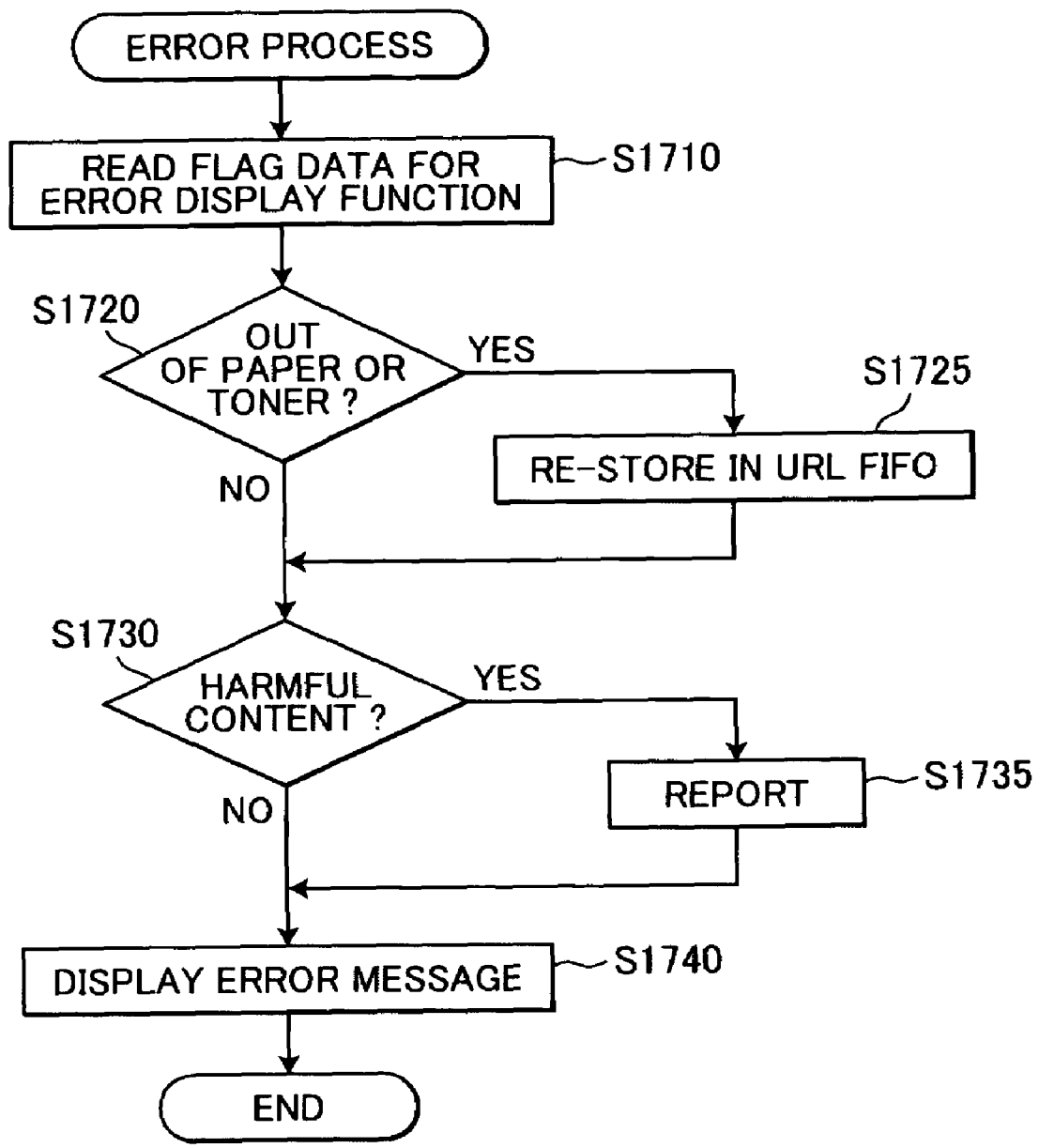
FIG. 28 is a flowchart representing an error process according to the present embodiment.
Figure 29:
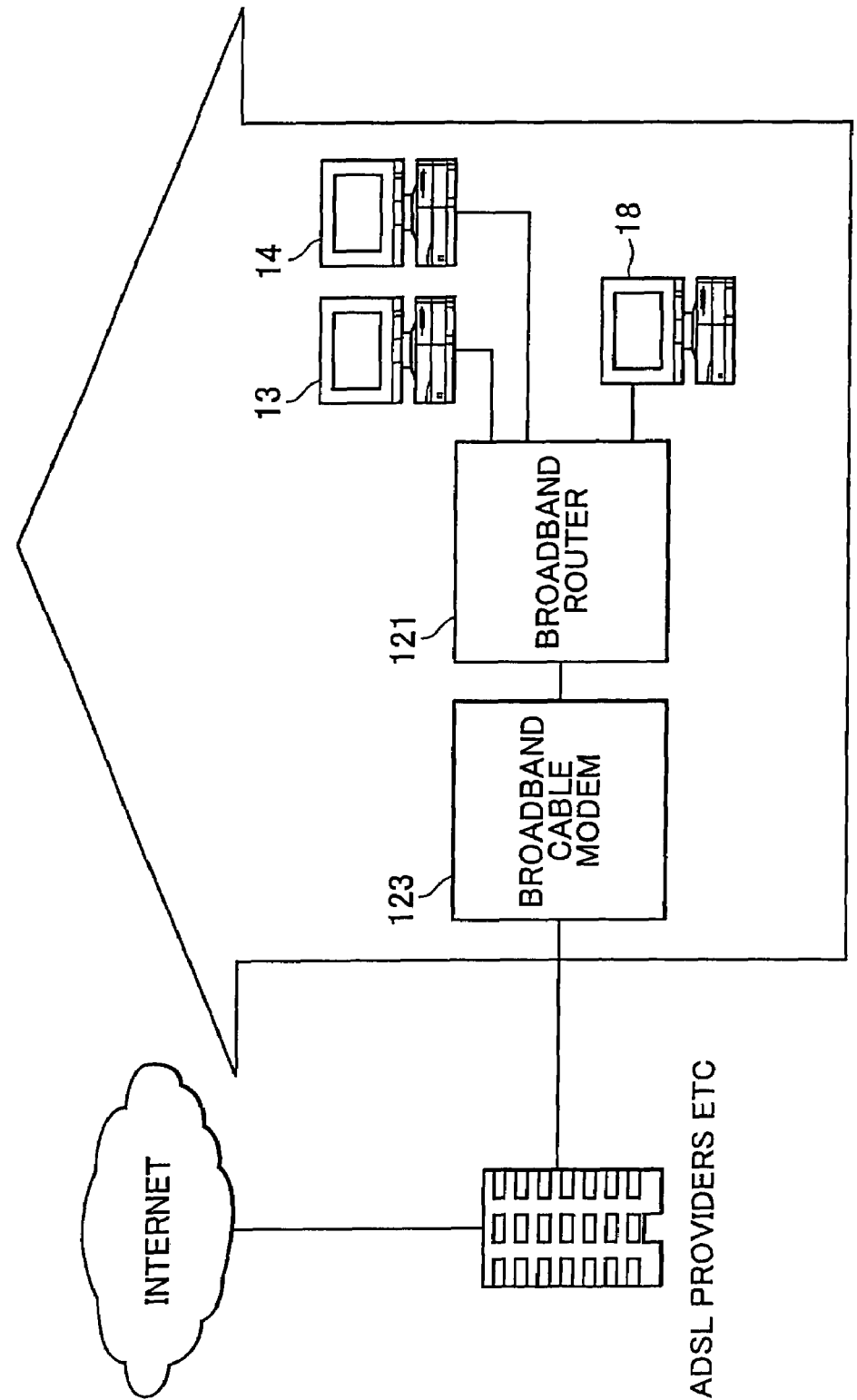
FIG. 29 is an explanatory diagram illustrating a conventional method for accessing the Internet.

In S1570, the CPU 111 determines whether or not the error display function is set to ON (that is, whether the flag value for the flag display function is "1"). If not (S1570:NO), then the output process ends. On the other hand, if so (S1570:YES), then an error process is executed in S1575. FIG. 28 is a flowchart representing the error process.

As shown in FIG. 28, when the error process starts, first in S1710, the CPU 111 reads the flag value of the error display function of the flag setting data from the RAM 115. In S1720, the CPU 111 determines whether or not an "out-of-paper error" or an "out-of-toner error" has occurred by determining whether the flag value is one of "1" and "2". If the CPU 111 determines that either an "out-of-paper error" or "out-of-toner error" has not occurred (S1720:NO), then the process advances to S1730. On the other hand, if the CPU 111 determines that an "out-of-paper error" or an "out-of-toner error" has occurred (S1720:YES), then in S1725, the CPU 111 re-stores the URL corresponding to the downloaded data for which an error occurred into the URL FIFO. Then, the process proceeds to S1730.

In S1730, the CPU 111 determines whether or not the downloaded data includes harmful data (for example, illegal data or personally annoying data) by referencing the log and the like for keyword errors. If not (S1740:NO), then the process advances to S1740. On the other hand, if so (that is, the web server identified by the URL is providing harmful data) (S1730:YES), then in S1735, the CPU 111 transfers data concerning the URL providing such harmful content to a pre-registered external device to which such data is reported. Here, the keyword database 115f stores keywords for identifying harmful data. The facsimile device 1 executes the process to determine keyword output authorization in order to find these keywords. Then, the process proceeds to S1740.

In S1740, the CPU 111 displays an error message corresponding to the flag of the error display function and subsequently ends the error process. When the error message ends, the output process (FIG. 26) and the communication-output process (FIG. 14) also end simultaneously.

Figure 13:
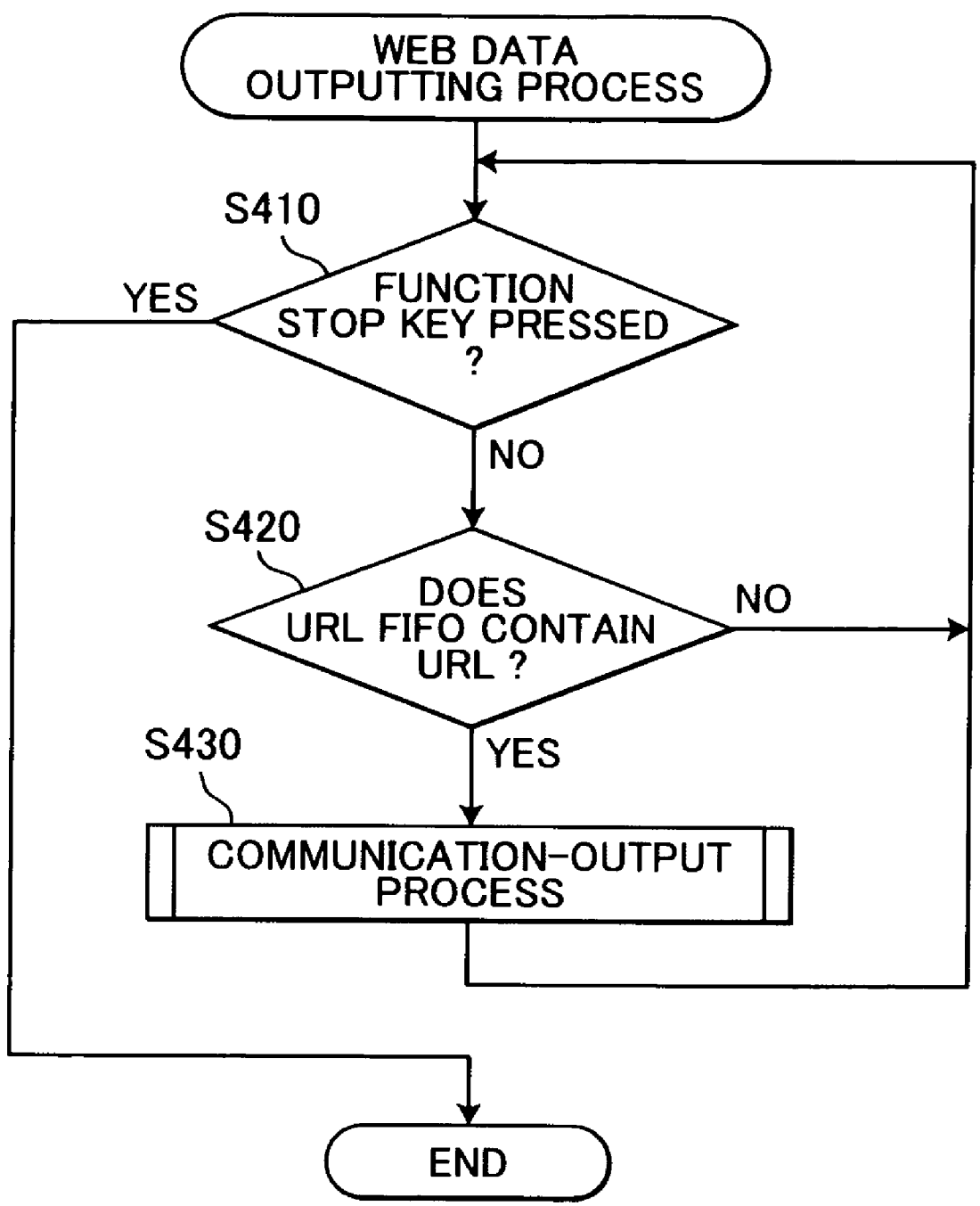
FIG. 13 is a flowchart representing a web data outputting process according to the present embodiment.

After ending the communication-output process of FIG. 14 in S430 of FIG. 13, the process returns to S410 in the web data outputting process of FIG. 13. Then, the same process described above are repeatedly executed until either a halt instruction is inputted (S410:YES) or the main power is switched OFF.

As described in the above embodiment, the router controller 101 built into the facsimile device 1 is provided with a function of a broadband router. Therefore, the LAN terminals 13 through 17 connected to the LAN connection port 7 of the communication module 5 can easily be connected to the Internet by connecting the broadband-capable modem (the ADSL modem 9 in the preferred embodiment) to the WAN connection port 6 of the communication module 5 via a LAN cable, without providing a separate broadband router 121, installing complicated wiring, or performing difficult settings.

Because the ADSL modem 9, which is a broadband-cable modem, is connected to the communication module 5, it is possible to perform rapid data communications between the communication modem 5 and the web server 21. Hence, data from the web server 21 can be acquired and provided more quickly to the user.

Further, the facsimile device 1 can connect itself to the web server 21 and receive data from a desired web page based on a URL inputted from the LCD 274, and also can print the received data using the recording unit 37. Accordingly, the user can easily acquire data from a desired web page without having a personal computer 13, 14, or the like. Because the facsimile device 1 can operate as a printer, the user can transfer data to be printed from a LAN terminal to the facsimile device 1 via a LAN and output (print) this data using the facsimile device 1. The user need not provide a separate broadband router or printer and need not worry about installation space for these devices.

In particular, since the facsimile device 1 has a plurality of functions, including a facsimile function, a web printing function, a printer function, an e-mail transmission/reception function, and a copy function, the facsimile device 1 can process various types of data. Further, the facsimile device 1 can be used to configure a system that centralizes all data input/output in a single unit. As a result, the user can easily construct and use a network system without much thought.

In the facsimile device 1 of the preferred embodiment, a printer function is executed through remote operations (via a LAN), while a web printing function is executed by instructions inputted via the operating panel 27. While the web printing function is given priority over the printer function, the printer function is given priority only when the remaining number of pages to be printed is few.

That is, it is highly probable that a user will be near the facsimile device 1 when operating the web printing function. If the facsimile device 1 puts priority on operating the printing function over the web printing function, data for another user operating the printing function by remote control and not likely to be near the facsimile device 1-may be printed first, even if the user wishes to output data acquired from a web server to view the data immediately.

In view of foregoing, the web printing function is given priority over the printer function in the present embodiment. In this manner, it is possible to provide the output results quickly to a user who wishes to view data acquired from a web server, thereby not causing the user stress in waiting.

However, if priority is given to operating the web printing function when only a few pages (2 or 3, for example) remain to be printed by the printing function that is currently in operation, the user of the printing function is inconvenienced by having to wait until the operations of the web printing function are completed before obtaining the output results.

In order to overcome this problem, priority is given to operating the printing function when the amount of data from the LAN terminal driving the recording unit 37 is small (for example, when the remaining number of pages to be printed by the printing function are few). Accordingly, output results can be provided quickly to both the user using the web printing function and the user using the printer function, reducing the amount of stress that may be felt by these users.

With the facsimile device 1 of the present embodiment, it is possible to prevent data at a URL from being downloaded by pre-storing URLs of a server providing inappropriate content in the access prohibited database 115e. Hence, the facsimile device 1 of the preferred embodiment can prevent inappropriate data from being printed.

In the facsimile device 1 of the present embodiment, it is possible to determine whether or not downloaded data should be printed based on keywords. Therefore, it is prohibit the printing of downloaded data containing words or phrases related to data content that does not need to be printed by pre-storing these words and phrases in the keyword database 115f.

In addition, the facsimile device 1 of the present embodiment can regulate the printing of downloaded data by passwords, thereby preventing inappropriate data from being provided to users that do not know the password.

The facsimile device 1 can also conveniently prohibit the printing of data that is the same as downloaded data that was previously printed based on history data. Hence, if the user does not know whether data content provided on the web server 21 has already been printed or not, the facsimile device 1 can prevent printing of the same content when the data has not been updated, thereby avoiding the printing of the same content over and over.

In addition, the facsimile device 1 can automatically download and print data according to a recorded schedule. This is convenient when the user wishes to print data from a web server whose data is updated on predetermined days. Further, the facsimile device 1 can acquire and print updated data from a web server upon receiving notification, enabling new data to be quickly provided to the user.

The facsimile device 1 of the present embodiment can also transfer downloaded data to the personal computers 13 and 14 and store the data into a storage medium of the personal computers 13 and 14 while prohibiting the printing of this downloaded data when the answering machine function is set to ON, thereby preventing data from being uselessly printed when the user is out. After returning home, the user can use the printing function of the facsimile device 1 to print the downloaded data by transmitting the downloaded data from the personal computers 13 and 14 to the facsimile device 1.

The facsimile device 1 can print downloaded data more quietly than normal during the nighttime. Accordingly, the user need not worry much about printing noise when scheduling data to be automatically downloaded and printed at night.

The facsimile device 1 of the present embodiment is configured to transfer downloaded data to a monochrome printing device (a monochrome laser printer or the like) capable of printing large quantities, when the downloaded data is monochrome data or when the amount of data to be printed is large, and to print the downloaded data on the monochrome printing device. Hence, when printing a large volume of data for a printing job that will take a long period of time, it is possible to avoid the printing function from being inoperable for a long period of time. The facsimile device 1 of the preferred embodiment can also switch to a monochrome printing mode for printing the downloaded data when toner for one of the four colors is out, providing printing results to the user when the user wishes to print the downloaded data urgently.

The facsimile device 1 of the present embodiment is also configured to display an outline of the downloaded data content on the LCD 274 to prompt the user regarding whether to print the data or not and to print the downloaded data only after receiving permission from the user. Hence, the facsimile device 1 can determine whether to print downloaded data after the user gets an idea of the data content to be printed, thereby avoiding the printing of unneeded data.

In the above-described facsimile device 1, data received from a web server can be transferred to a LAN terminal such as a personal computer having a data displaying function and a data storing function in order to display the data on a display device provided in the LAN terminal or store the data into a hard disk or the like, also provided in the LAN terminal.

While the invention has been described in detail with reference to specific embodiments thereof, it would be apparent to those skilled in the art that many modifications and variations may be made therein without departing from the spirit of the invention, the scope of which is defined by the attached claims.

For example, although a single LAN connection port 7 has been provided in the facsimile device 1 of the above embodiment, it is possible to provide a plurality of LAN connection ports. Further, in the example of the above embodiment, the ADSL modem 9 is connected to the WAN connection port 6. However, a DSL modem or a cable modem can be connected to the WAN connection port 6 instead. Since the functions of a broadband router are built into the communication module 5 of the above embodiment, a DSL modem or cable modem can be directly connected to the communication module 5 via a cable, and the communication module 5 can perform bi-directional communications with a server on the WAN via this DSL modem or cable modem.

Since it is possible to determine whether printing should be prohibited based on history data prior to downloading data according to the manner in which history data is handled, the facsimile device 1 can execute the process to determine history output authorization prior to downloading data in this case. If the URLs of downloaded data that have been printed are stored as history data, in other words, it is possible to determine whether to print the data by comparing the history data to the URL from which data is to be downloaded prior to downloading the data. In this case, it is possible to execute the process to determine URL access authorization simultaneously with the process to determine history output authorization.

In the above-described embodiment, the present invention is applied to a facsimile device, but the present invention can also be applied to a printer, a copy machine, and the like, or to a device that cannot print in color (a monochrome printing device). When applying the present invention to a monochrome printing device, multicolor data downloaded from a web server can be transferred to a device capable of printing in color via the LAN in order to print the downloaded data on the color printing device.

Further, while the example in the above-described embodiment forms images through color laser printing, the image forming device can also be configured to form images through color inkjet printing. Further, in the example of the above-described embodiment, the ADSL modem 9 and the communication module 5 are connected via the LAN cable L3, but the ADSL modem 9 and the communication module 5 can also be connected wirelessly.

The image forming device can be configured to transmit data acquired from a web server to a LAN terminal in response to a request from the LAN terminal. The image forming device can also be configured to transmit the data to the LAN terminal when a user performs external operations on an operating unit to input a data transmission instruction.

What is claimed is:

1. A communication system comprising:
   an image forming device, the image forming device including:
      an image forming unit that forms images on a recording medium;
      a communicating unit that is connectable directly to a broadband-capable modem so as to perform bi-directional communications with a web server that is provided on a wide area network via the broadband-capable modem; and
      a data outputting unit that has a web printing function for controlling the image forming unit to form images on the recording medium based on data that the communicating unit receives from the web server;
   the broadband-capable modem that is connected to and performs bi-directional communications with the communicating unit of the image forming device, the broadband-capable modem relaying communications between the web server provided on the wide area network and the image forming device; and
   a LAN terminal that is connected to and performs bi-directional communications with the communicating unit of the image forming device, the LAN terminal being capable of receiving data that the communicating unit of the image forming device receives from the web server on the local network,
   wherein, the data outputting unit of the image forming device further has a printing function for controlling the image forming unit to form images on the recording medium based on data that the communicating unit receives from the LAN terminal on the local area network, and
   wherein the data outputting unit of the image forming device gives priority to operating the web printing function over the printing function when an amount of data received from he LAN terminal is equal to or greater than a predetermined amount, and gives priority to operating the printing function over the web printing function when the amount of data received from the LAN terminal is less than the predetermined amount.

2. The communication system according to claim 1, wherein the image forming device further comprises:
   a transferring unit that transfers data that the communicating unit receives from the web server to the LAN terminal on the local area network; and
   an output switching unit that selectively controls, based on predetermined conditions, one of the data outputting unit and the transferring unit to operate.

3. The communication system according to claim 1, wherein the data outputting unit gives priority to operating the web printing function over the printing function.

4. The image forming device according to claim 1, further comprising a main case accommodating the image forming unit, the communicating unit, and the data outputting unit.

5. An image forming device comprising:
   an image forming unit that forms images on a recording medium;

a communicating unit that is connectable directly to a broadband-capable modem so as to perform bi-directional communications with a web server that is provided on a wide area network via the broadband-capable modem; and a data outputting unit that has a web printing function for controlling the image forming unit to form images on the recording medium based on data that the communicating unit receives from the web server, wherein the communicating unit is connectable to a local area network and transmits data received from the web server to a LAN terminal on the local area network, wherein the data outputting unit further has a printing function for controlling the image forming unit to form images on the recording medium based on data that the communicating unit receives from the LAN terminal on the local area network, and wherein the data outputting unit gives priority to operating the web printing function over the printing function when an amount of data received from the LAN terminal is equal to or greater than a predetermined amount, and gives priority to operating the printing function over the web printing function when the amount of data received from the LAN terminal is less than the predetermined amount.

6. The image forming device according to claim 5, further comprising a main case accommodating the image forming unit, the communicating unit, and the data outputting unit.

* * * * *